US008509864B1

(12) United States Patent  (10) Patent No.: US 8,509,864 B1
Diebel  (45) Date of Patent: *Aug. 13, 2013

(54) PREVENTING GLARE TO CAMERA FROM FLASH IN SMARTPHONE CASE

(75) Inventor: Markus Diebel, San Francisco, CA (US)

(73) Assignee: Incase Designs Corp., Chino, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/185,200

(22) Filed: Jul. 18, 2011

Related U.S. Application Data

(60) Provisional application No. 61/365,302, filed on Jul. 16, 2010.

(51) Int. Cl.
*H04M 1/00* (2006.01)
(52) U.S. Cl.
USPC .................. 455/575.8; 455/90.3; 455/575.1; 455/566; 361/679.32; 361/679.41; 379/330
(58) Field of Classification Search
USPC ..... 455/575.8, 90.3, 575.1, 566; 361/679.32, 361/679.41; 379/330
See application file for complete search history.

(56) References Cited

U.S. PATENT DOCUMENTS

| 7,083,291 B1 * | 8/2006 | Yong et al. ..................... 359/612 |
| 7,612,997 B1 * | 11/2009 | Diebel et al. ............. 361/679.56 |
| 7,782,610 B2 * | 8/2010 | Diebel et al. ............. 361/679.56 |
| 7,889,498 B2 * | 2/2011 | Diebel et al. ............. 361/679.56 |
| D665,386 S * | 8/2012 | Fathollahi .................... D14/250 |
| 2005/0012842 A1 * | 1/2005 | Miyagawa et al. ...... 348/333.01 |
| 2008/0096620 A1 * | 4/2008 | Lee et al. ................... 455/575.8 |

* cited by examiner

*Primary Examiner* — Sanh Phu
(74) *Attorney, Agent, or Firm* — Aka Chan LLP

(57) ABSTRACT

A case for portable electronic devices including smartphones includes a feature to prevent glare from a flash from affecting images and video captured by a camera lens. Smartphones have telephony, Internet connectivity, and camera and video features. Photos and video can be uploaded through the Internet or sent to other phones. A case has hole for a camera flash of the smartphone to pass through. The edging of the hole is colored black or another dark color to prevent glare from appearing in the photos or video taken by the smartphone when using the camera flash.

112 Claims, 17 Drawing Sheets

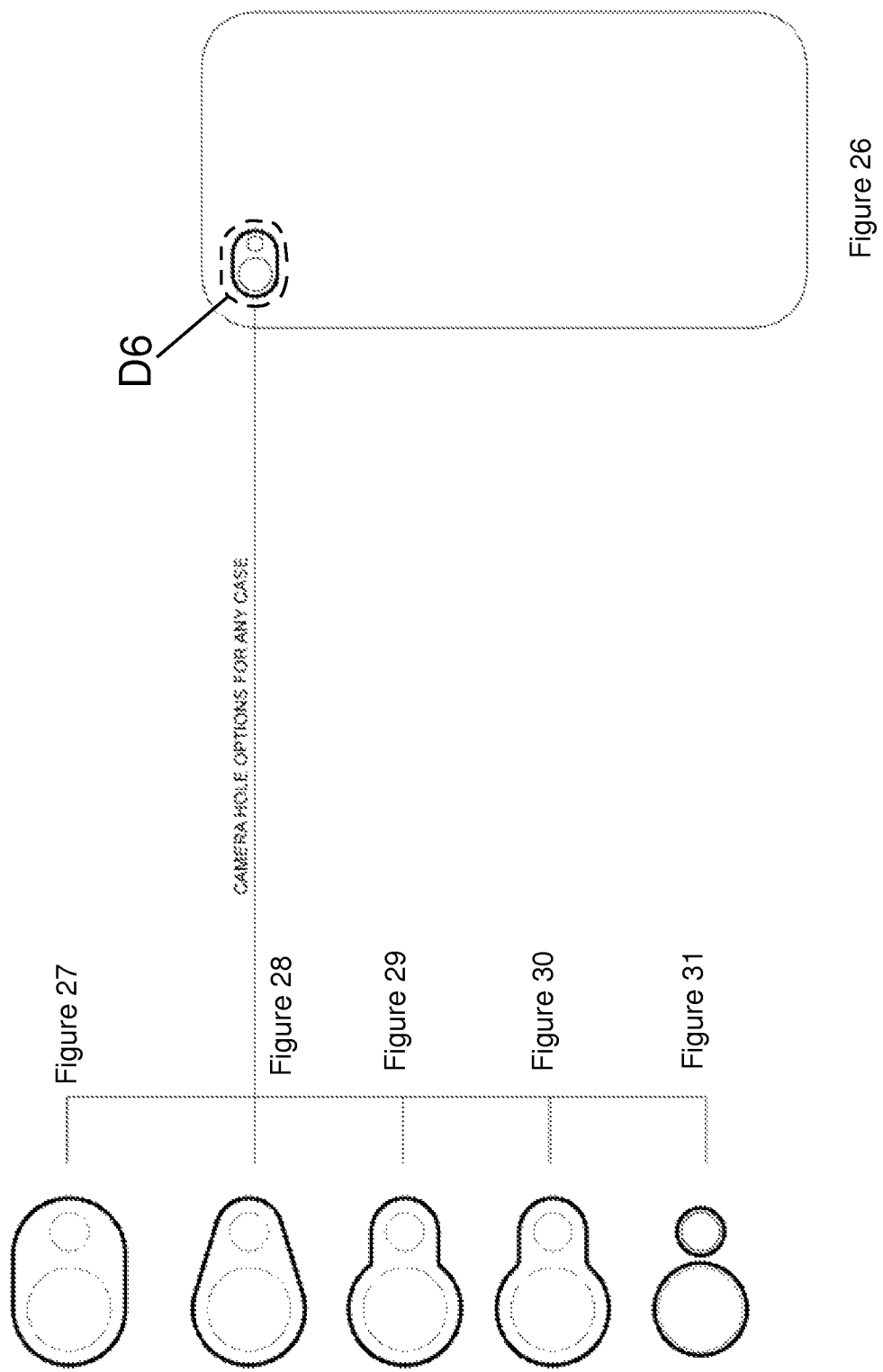

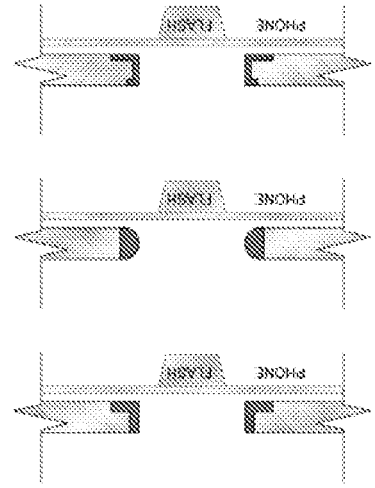
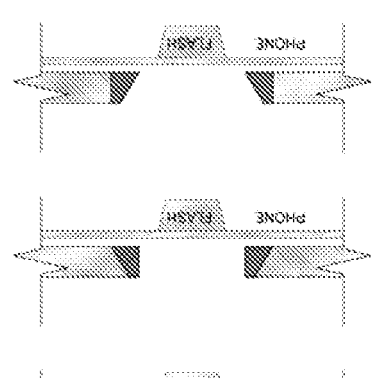
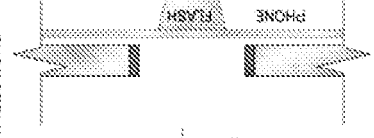
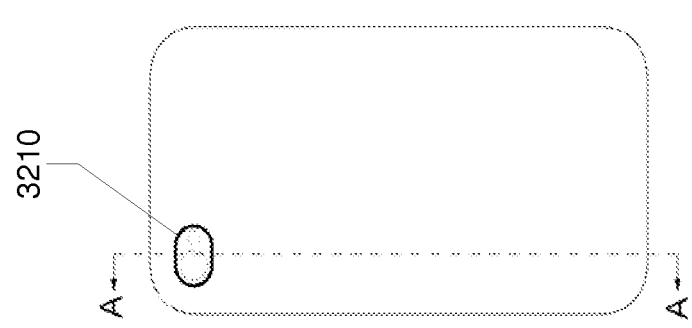
Figure 32

US 8,509,864 B1

PREVENTING GLARE TO CAMERA FROM FLASH IN SMARTPHONE CASE

CROSS-REFERENCE TO RELATED APPLICATIONS

This patent application claims the benefit of U.S. provisional application 61/365,302, filed Jul. 16, 2010, which is incorporated by reference along with all other references cited in this application.

BACKGROUND OF THE INVENTION

This invention relates to accessories for electronic devices and more specifically to cases for portable electronic devices and smartphones, especially where such devices have cameras and flashes.

With each new generation, portable electronic devices and smartphones provide greater functionality and have more capabilities. Protective cases are used to protect these devices from possible damage. It is desirable that these cases allow users to use the functionality of their devices, while devices remain in their cases. Cases can also be used to enhance the functionality and capabilities of the phone.

For example, portable electronic devices and smartphones have cameras to take pictures and capture video. With a flash, these cameras can take picture and video in low light or dark conditions. However, the flash can cause glare to pictures and video taken by the camera lens. Glare will cause the pictures and video to become washed out, which is undesirable.

There is a need for cases for portable electronic devices that will protect the devices, while at the same time, prevent or reduce glare to pictures and video taken by the cameras when a flash is used.

BRIEF SUMMARY OF THE INVENTION

A case for portable electronic devices including smartphones includes a feature to prevent glare from a flash from affecting images and video captured by a camera lens. Smartphones have telephony, Internet connectivity, and camera and video features. Photos and video can be uploaded through the Internet or sent to other phones. A case has hole for a camera flash of the smartphone to pass through. The edging of the hole is colored black (e.g., black pigment, black paint, or black ink) or another dark color (e.g., dark blue, dark green, or violet) to prevent glare from appearing in the photos or video taken by the smartphone when using the camera flash.

In an implementation, a method of making a case for an electronic device includes: forming a back of the case having an inside surface and outside surface; forming a camera-flash opening in the back of the case, where the camera-flash opening extends from the inside surface through to the outside surface; and applying a dark coloring to an edging of the camera flash opening. This dark coloring can be black and the case can be white or other light coloring. The dark coloring may be a black paint or black ink. The dark coloring may be from overmolding, inserting, gluing, or snapping, or any combination of these, a dark colored material over the edging of the camera-flash opening. The dark colored material may be the same or different from the material used for the case. A slope of the edging may be 0 or greater.

In an implementation, a case for an electronic device has a first case portion including: a first base surface upon which a back of a housing of the electronic device will be placed against, where the base surface includes a top edge; and a lower sidewall, connected to the first base surface at an end opposite of the top edge, that will be positioned against a bottom side edge of the electronic device.

The case has a second case portion including: an upper sidewall that will be positioned against a top side edge of the electronic device when the second case portion is seated against the first case portion, and an open side end, opposite the upper sidewall. The second case portion slides onto the first case portion through the open side end. When the second case portion is seated against the first case portion, the first and second case portions meet at and form a seam or part line which extends across a back of the case.

The case has a camera-flash opening, including a hole through the back of the case, where the camera-flash opening has a length dimension greater than a width dimension, and an edging of the camera-flash opening has a dark-colored coloring. The edging of the camera-flash opening has a different coloring compared to the material of the back of the case.

The second case portion is seated against the first case portion. A first open-shaped opening for the first case portion merges with a second open-shaped opening for the second case portion to form a front opening of the case through which a screen of the electronic device will be visible, the front opening having a closed shape. The back opening has a closed shape through which a camera flash and camera lens of the electronic device will be visible.

In an implementation, a case for an electronic device includes: a first base surface upon which a back of a housing of the electronic device will be placed against, a camera-flash opening, including a hole through a back of the case, where the camera-flash opening has a length dimension greater than a width dimension, and an edging of the camera-flash opening has a dark-colored coloring, and the camera-flash opening has a closed shape through which a camera flash and camera lens of the electronic device will be visible.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 26 shows a back of a case to show examples of camera opening or hole options from FIGS. 27-31.

FIG. 27 shows a first opening option having an oval shape.

FIG. 28 shows a second opening option having an egg shape.

FIG. 29 shows a third opening option having a keyhole shape.

FIG. 30 shows a fourth opening option having a keyhole shape.

FIG. 31 shows a fifth opening option having two circular openings.

FIG. 32 shows a back of a case with a section line passing through camera-flash opening to show examples of camera opening or hole treatment options from FIGS. 33-40.

FIG. 33 shows a first treatment option where the edging and inside border around the opening is painted a dark color (e.g., black).

FIG. 34 shows a second treatment option where the edging, but not the border is painted a dark color.

FIG. 35 shows a third treatment option where a dark color material (e.g., overmold or insert) is attached to the opening edging.

FIG. 36 shows a fourth treatment option where the dark color material is attached to a sloped edge in the case material opening.

FIG. 37 shows a fifth treatment option where the dark color material has a sloped edge.

FIG. 38 shows a sixth treatment option where the dark color material is received in a countersink or recess of the case.

FIG. 39 shows a seventh treatment option where the dark color material has a rounded edge.

FIG. 40 shows an eighth treatment option where the dark color material is received in two countersinks or recesses of the case.

DETAILED DESCRIPTION OF THE INVENTION

Figure 1:
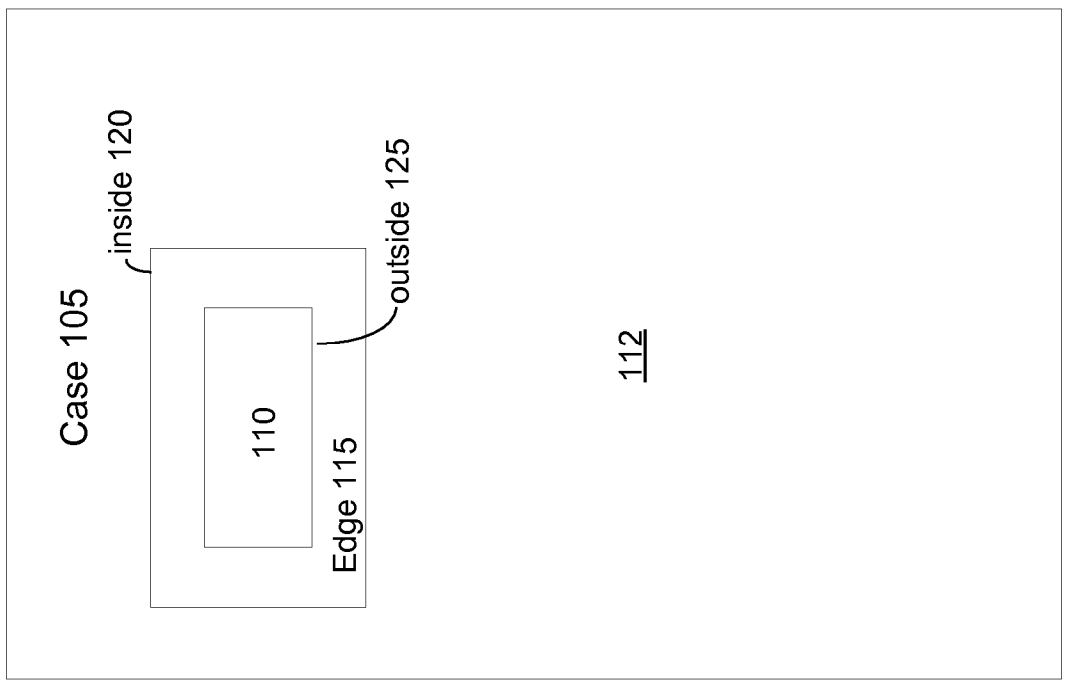
FIG. 1 shows a block diagram of a back view of a case having a single camera-flash opening.

FIG. 1 shows a block diagram of a back view of a first embodiment of a case 105 for a smartphone or other portable electronic device. In a specific implementation, the case is used for the Apple iPhone 4g (from Apple Inc.).

Smartphones and portable electronic devices are valuable because of their functionality, the information they contain, and time and expense to replace. A case is typically much easier and less expensive to replace than the device which it houses and protects.

A case protects the smartphone or portable electronic device from scratches, dings, dents, and other damage. The case also provides shock absorption. The case will absorb impacts, preventing shock to the components of the device which are often delicate. The case can also improve the grip to the device and case combination. The case may include a texture pattern, be made from a tacky material, or have a tacky coating, or include a wrist or neck strap. The case may also be waterproof or water resistant to protect the device from rain, snow, and surf.

A case is typically an important accessory for the device that it protects. For, a person might accidentally drop a smartphone in the case on the floor when running to catch a flight for a business trip at the airport. The case may crack or even shatter into many pieces, but the smartphone will remain intact and unbroken, saved by the case. The person can pick up the smartphone, continue on the flight, and use the smartphone on the business trip.

If the smartphone had not been protected by a case, the smartphone might have become broken. The screen may become cracked or there might have been other damage rendering the device inoperable. The person typically would not have been able to replace the smartphone soon enough, especially if there was important information saved on the smartphone (e.g., sales presentation slides) that are needed for the business trip.

Further, a case may be useful in improving wireless reception and preventing dropped calls. For example, the iPhone 4g includes a stainless steel band around the edge of the phone. This band functions as two antennas for the iPhone 4g. Depending on how a user grips the stainless steel band, the wireless reception strength may be diminished and result in dropping of a call. Since the case is made from an insulator or nonconductive material (e.g., polycarbonate, silicon, or rubber), the user's gripping of the case will no longer short to the stainless steel band. Regardless of the user's grip, the wireless reception strength will be unaffected. Therefore, cases for smartphones and portable electronic devices are valuable accessories.

This patent application describes aspects of the invention with respect to the iPhone 4g. However, the principles of the invention are not limited to the iPhone 4g, but are applicable to any portable electronic device or smartphone or other telephony device. Some examples of other devices that the invention will be applicable to include cameras, video cameras, webcams, media players including MP3 and video players, personal digital assistants (PDAs) such as the iPAQ line of products from Hewlett Packard (www.hp.com), handheld computers, Blackberry smartphones (from Research in Motion Limited, na.blackberry.com), Samsung smartphones (www.samsung.com), Motorola phones (www.motorola.com), HTC smartphones (www.htc.com), phones running the Android platform or operating system from Google (www.google.com, www.android.com), Nokia phones (www.nokiausa.com), and laptop and notebook computers.

Figure 10:
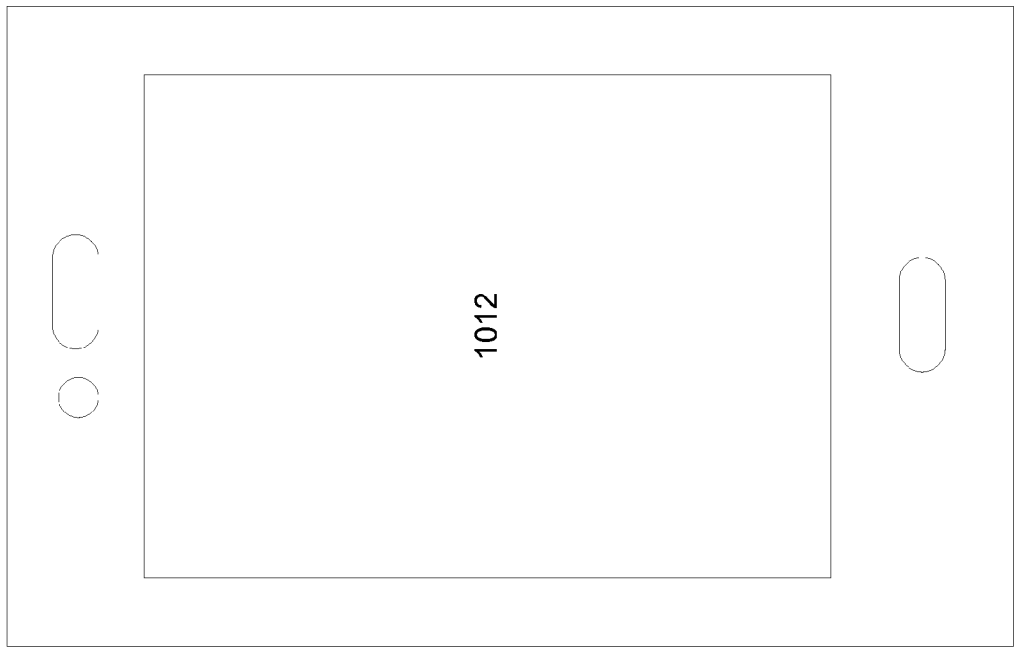
FIG. 10 shows a front view of the smartphone.
Figure 9:
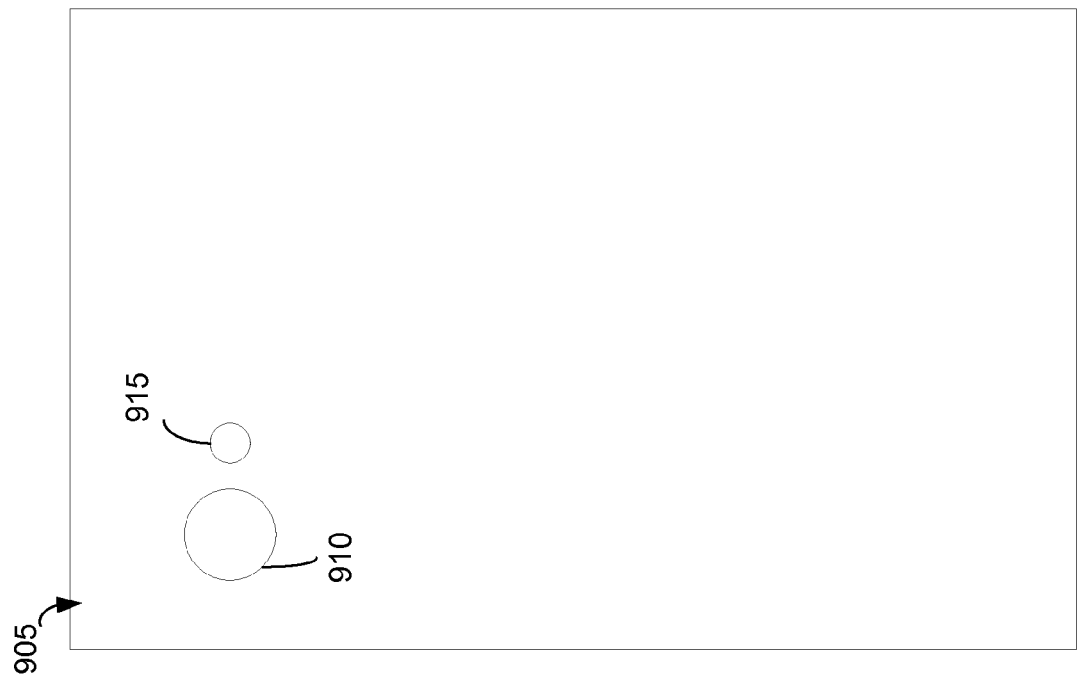
FIG. 9 shows a back view of a representative smartphone.

A feature of the smartphone or electronic device is a camera with flash. For example, FIG. 9 shows a back view of a representative smartphone 905. FIG. 10 shows a front view of the smartphone. In a specific implementation, the smartphone is the iPhone 4g. The iPhone 4g has a 5-megapixel camera 910 with a built-in LED flash 915 on its back. The built-in LED flash illuminates low-light scenes. When taking pictures or photographs, the LED works as a flash. When shooting video, the LED can stay on to light up the scene. The flash is positioned very close (e.g., about 1-5 millimeters) to the camera lens.

In FIG. 1, a back of the case has a single opening 110 for both the camera lens and flash of the phone. While the phone is in the case, the user can use the camera and flash without needing to remove the phone from the case.

When using the flash to take picture or video, glare may be introduced in the picture or video. The glare may result when the smartphone is not in a case under certain circumstances or conditions, such as the case having a white or glossy back or the flash striking another surface, bouncing back, and being captured by the camera. Placing the smartphone in a case may increase the glare, especially for light color cases or cases other than black. For example, a white smartphone case may cause images and video captured by the camera to have more glare from the flash as compared to black cases.

Further, glare may result from light leakage from the flash and backlight of the phone. For example, some phones have a semi-translucent back piece. Some commentators have speculated that light from the flash and backlight of the phone leaks into the semi-translucent back piece which causes the back piece to glow—similar to a light guide. The glowing light is captured by the camera which then results in poor pictures such as the pictures being "washed out." When the phone is placed in a case without glare reducing features as presented in this patent application, the picture and video quality may be further degraded because the glowing light may bounce off the inside back of the case and be reflected into the camera lens.

This patent application presents techniques for a case to prevent or reduce the glare from the flash in pictures and video taken by the camera. Such techniques may reduce glare compared to untreated cases and even compared to a smartphone not in a case.

As shown in FIG. 1, this case includes single opening 110, an outside case surface 112, and an inside case surface, opposite the outside case surface. Opening 110 includes an edge or edging 115. The edging is between an inside 120 of the case and an outside 125 of the case. According to a technique, the edging of the camera-flash opening is made black or another dark color such as dark gray, charcoal, brown, mahogany, dark cherry, dark green, dark purple, midnight blue, chocolate, and others.

A glossy black color will reduce flash glare, especially compared to a white color case without the black coloring. A matte black color or matte finish may reduce glare even further. The black coloring on the edging reduces glare by reducing light bouncing off the edging surface and affecting pictures and video taken with the camera lens.

Figure 2:
FIG. 2 shows a block diagram of a back view of a case having two openings.

FIG. 2 shows a back view of a second embodiment of a case 205. This case is similar to the case shown in FIG. 1, but this case includes two openings. There is a first opening 210 having a first edging 215 and a second opening 220 having a second edging 225. The first opening is for one of the camera lens or flash of the phone. The second opening is for another of the camera lens or flash of the phone.

In a specific implementation, both the first edging of the first opening and the second edging of the second opening are made a dark color. In another specific implementation, at most one of the first or second edgings is made a dark color which can reduce the cost to make a case. For example, the first edging of the first opening can be made a dark color and the second edging of the second opening can be in a light color. Alternatively, the configuration can be swapped so that the second edging of the second opening can be made a dark color and the first edging of the first opening can be in a light color.

When both the first and second edgings are made the dark color more glare may be reduced as compared when just one of edgings is made the dark color. However, in some cases it may not be desirable to make both edgings the dark color. Some cameras are less sensitive to glare as compared to other cameras. For example, the camera may include a lens filter such as a polarizing filter to reduce glare. When this is the case, one of the edgings (e.g., flash opening edging) may be made in the dark color and another of the edgings (e.g., camera opening edging) may be in a light color.

Whether a case has two camera-flash openings—one opening for the camera and another opening for the flash (FIG. 2) or a single camera-flash opening (FIG. 1) depends on various factors such as the distance between the camera lens and flash, the thickness of the case material, the size or diameter of the camera lens and flash, or combinations of these. Two openings may reduce glare more than a single opening because there will be some case material between the camera and flash to absorb or block light that would otherwise result in glare. A single large opening can make it easier for the camera lens and flash to be cleaned without having to remove the phone from the case.

FIGS. 3-8 show cross sections of different embodiments of a camera-flash opening of a case. These figures show what portions, regions, or surfaces of the camera-flash opening may have a dark-colored coloring as indicated by the shaded blocks so that glare to pictures and video taken by the camera can be prevented or reduced.

Figure 3:
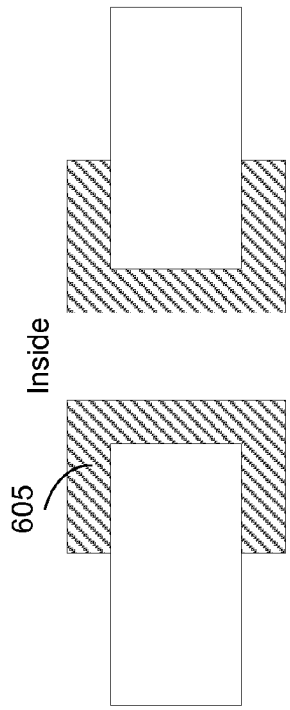
FIG. 3 shows a cross section of a case at the camera-flash opening where the edging has a dark color.

FIG. 3 shows a cross section of a first embodiment of a case where there is a dark-colored coloring 305 on the edging of the camera-flash opening, but the outside and inside of the case near the opening are in a lighter color (e.g., white).

Figure 4:
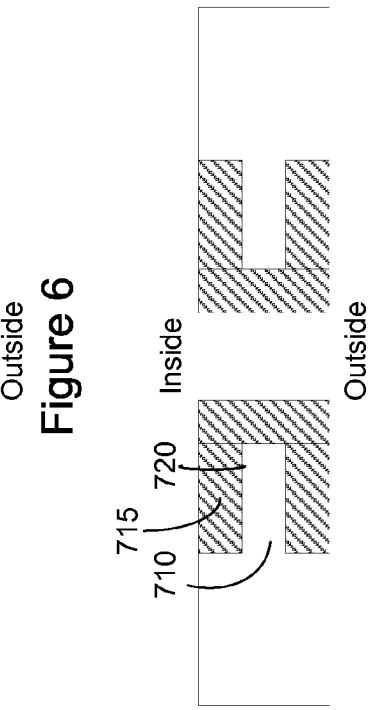
FIG. 4 shows a cross section of a case at the camera-flash opening where the edging and outside border around the opening has a dark color.

FIG. 4 shows a cross section of a second embodiment of a case where there is a dark-colored coloring 405 on the edging of the opening and a portion of the outside surface of the case, but the inside of the case is in a lighter color. When this case is viewed from the front (i.e., looking from the outside towards the inside of the case), the dark-colored coloring will appear as a black or dark-colored ring around the opening. For example, the ring may surround, encircle, or at least partially encircle the opening. This ring faces away from the back of the phone. The ring may have circular or noncircular shape. The ring may be referred to as a border, rim, margin, brim, shoulder, outline, or frame.

Making the outside surface of the case near the opening a dark color can help to prevent or reduce glare from light that would otherwise be reflected off the outside case surface near the opening. The glare can be from light from the flash reflecting off a surface and bouncing back towards the camera, ambient light, or both. Thus, the black or dark coloring can also be applied to the outside of the case (not only on the edging of the opening).

Figure 5:
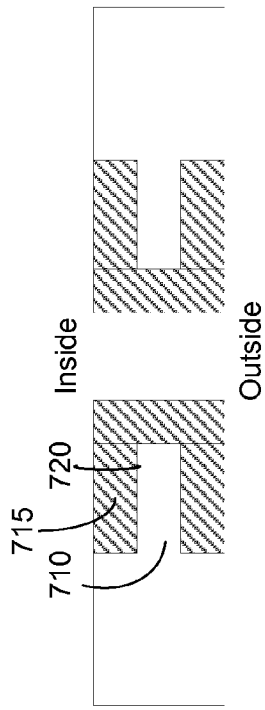
FIG. 5 shows a cross section of a case at the camera-flash opening where the edging and inside border around the opening has a dark color.

FIG. 5 shows the opposite of FIG. 4. Specifically, FIG. 5 shows a cross section of a third embodiment of a case where there is a dark-colored coloring 505 on the edging of the opening and a portion of the inside surface of the case, but not on the outside of the case.

When the phone is in the case, there may be a small gap between the phone and the case. Then the flash can bounce off the inside back of the case, especially if the inside back has a light coloring or glossy finish. Therefore, in a further implementation, the black or dark coloring can be also applied in a border or ring surrounding the camera-flash opening on the inside back of the case. This black or dark color ring faces the back of the phone.

Figure 6:
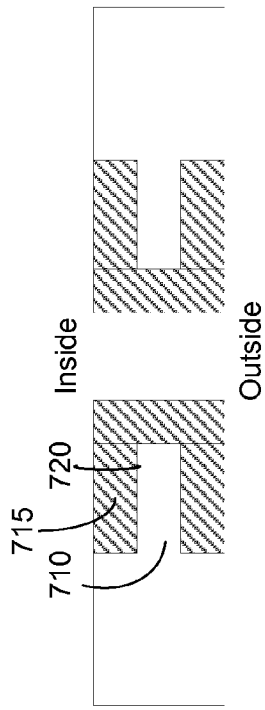
FIG. 6 shows a cross section of a case at the camera-flash opening where the edging, inside, and outside border around the opening has a dark color.

FIG. 6 shows a combination of FIGS. 4-5. Specifically, FIG. 6 shows a cross section of a fourth embodiment of a case where there is a dark-colored coloring 605 on the edging of the opening, a portion of the inside surface of the case, and a portion of the outside surface of the case near the opening.

Whether a case includes a dark-colored coloring on the edging only (FIG. 3), on the edging and outside surface surrounding the opening (FIG. 4), on the edging and inside surface surrounding the opening (FIG. 5), or on the edging, and inside and outside surfaces (FIG. 6) depends on factors such as the design of the camera, whether or not there will be a small gap between the phone and the case, or both. For example, if the camera, flash, or both of the phone are designed so that they are recessed into the back of the phone it may be desirable to apply a dark colored ring to the inside of the case to prevent the flash from bouncing off the inside back of the case. However, if the camera, flash, or both protrudes out from the back surface of the phone such that they also protrude into the camera-flash opening of the case it may not be desirable to apply the dark color to the inside surface of the case because the flash is unlikely to bounce off the inside back of the case and into the camera.

In a specific implementation, when manufacturing the case, a step is to apply black paint (e.g., flat black paint) or black ink or a black coating to an edging of the camera-flash opening. This step can be applied to any case exhibiting a glare issue including light color cases such as white, yellow, orange, pink, and others. When using black paint, the paint may be sprayed on or applied using a brush, paintbrush, or sponge. When using black ink, the ink may be applied using a marker or felt-tipped pen such as a Sharpie® marker, or a Magic Marker®. A template or guide can be placed onto the case when applying the black or dark coloring so that other surfaces of the case not intended to be colored are not accidentally colored with the dark coloring. A dark coating may be applied via heat sealing or press welding.

This step can be applied to any of the camera-flash opening arrangements discussed in this application. For an arrangement having two openings, the coloring can be applied to the edging of both openings, or any one of the openings.

In another specific implementation, a black or dark color material is used in the edging of the camera-flash opening. The black coloring material can be overmolded, inserted, glued (e.g., using epoxy), adhered, screwed, press-fitted, or snapped in place (or any combination of these) on the case. The black coloring material can be the same material as the other case material, or the black coloring material may be a different material from the other case material. The case material may be polycarbonate, silicone, thermoplastic polyurethane (TPU), thermoplastic elastomer (TPE), thermoplastic rubber (TPR), fiberglass, carbon fiber, or many others, or a composite or combination of these. For example, the case material is polycarbonate and thermoplastic rubber in black is fitted (e.g., like a grommet) into the camera-flash opening.

As another example, the case material can have first durometer and the black coloring material can have a second durometer where the first durometer is greater than the second durometer. The first durometer may be about 75 on a type D scale which is about the value for hard plastic. The second durometer may be about 50 which is about the value for rubber or solid truck tires on the type D scale.

In a specific implementation, dark-colored coloring 305 shown in FIG. 3 is a black band, strip, or black loop of material that is glued, bonded, fused, or otherwise attached to the edging of the camera-flash opening.

In another specific implementation, the coloring is a piece of material that is overmolded on the case. Overmolding is a molding or injection molding process where one material such as TPE is molded onto a second material such as rigid plastic. The overmolded or first material forms a strong bond with the second material as a result of the overmolding process. Some specific examples of overmolding techniques include insert molding and multi-shot injection molding.

In another specific implementation, dark-colored coloring 405 (FIG. 4), 505 (FIG. 5), or 605 (FIG. 6) is an insert that is attached to the case. The insert may be referred to as a grommet or eyelet. A grommet includes a tube portion and at least one flange, flared, or collared portion connected to an end of the tube portion. The tube portion is inserted through the camera-flash opening so that the flange portion butts up or is seated against the outside surface of the case (FIG. 4) or the inside surface of the case (FIG. 5). Alternatively, the grommet can have a flange portion at both ends of the tube portion so that when the grommet is attached to the case, a first flange portion will butt up against the outside surface of the case and a second flange portion will butt up against an inside surface of the case so that there will be a dark colored region on both the outside and inside of the case as shown in FIG. 6.

Figure 7:
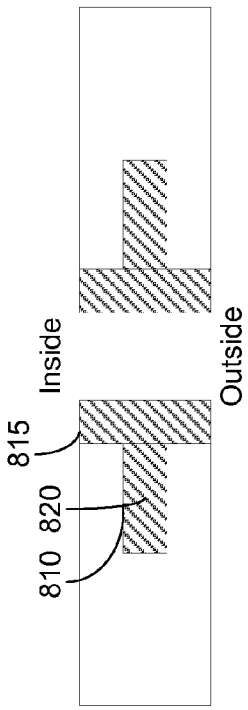
FIG. 7 shows a cross section of a case at the camera-flash opening having a dark colored insert.

FIG. 7 shows a cross section of a fifth embodiment of a case where the case includes a ridge 710 and the dark-colored coloring is a grommet or insert 715 that is at least partially held in place or retained by the ridge. The grommet includes a notch 720 which receives the ridge. The ridge may be referred to as a ledge, projecting edge, step, flange, tab, collar, or ring. The notch may be referred to as a groove, channel, or recess. When looking at a plan view of the case, the opening will appear to have a step down, recess, or counter sink. This step down can allow the grommet flange to sit flush with the case surface.

Figure 8:
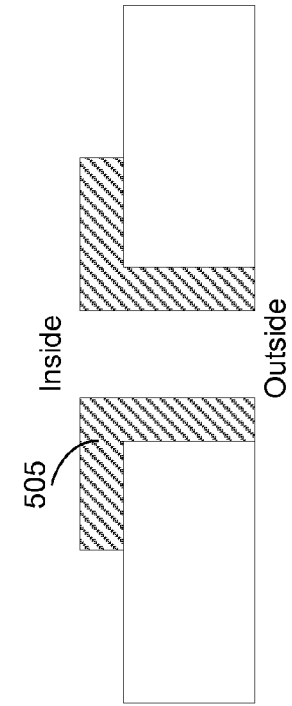
FIG. 8 shows a cross section of a case at the camera-flash opening having another implementation of a dark colored insert.

FIG. 8 shows a cross section of a sixth embodiment of a case. This case is similar to the case shown in FIG. 7, but the ridge and notch components are swapped. That is, the case includes a notch 810 and a grommet 815 includes a ridge 820.

With the case designs shown in FIGS. 7-8 the grommet may be able to stay secured within the camera-flash opening without using an adhesive because of the ridge and notch configuration or features. Omitting the step of applying an adhesive in the manufacturing process can save time and reduce the cost to make a case. Further, there will be no adhesive that will accidentally ooze out that will need to be cleaned from the case surface.

The dark or black color material or insert may be polycarbonate, silicone, thermoplastic polyurethane (TPU), thermoplastic elastomer (TPE), thermoplastic rubber (TPR), fiberglass, carbon fiber, paper, a sticker, a decal, felt, fabric (e.g., leather or imitation leather), cardboard, plastic, nylon, metal (e.g., stainless steel or aluminum), or many others, or a composite or combination of these. Materials such as silicon, rubber, and plastic are generally soft and less likely to scratch the phone or other objects that the insert may come into contact with. However, the insert may be made of a rigid material such as metal (e.g., stainless steel or aluminum) which may be brushed, or painted or anodized a dark color. A rigid insert may be installed using a setting tool or press. Alternatively, a rigid insert may include threads so that it can be screwed into the camera-flash opening of the case.

The dark or black color material may be provided separately from the case itself so that users can retrofit their existing cases that may have glare issues.

These techniques to reduce glare or treat the camera-flash opening with a dark or black coloring material can be applied to any of the camera-flash opening arrangements discussed in this application. For an arrangement having two openings, the dark or black coloring material can be applied to the edging of both openings, or any one of the openings.

The table A below shows a specific implementation of a flow for making a case having a camera-flash opening with a glare preventing or reducing feature. It should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

TABLE A

| Step 1 | Provide a case. |
|---|---|
| Step 2 | Make a camera-flash hole through a back of the case. |
| Step 3 | Apply a dark-colored coloring to the camera-flash hole. |

In a step 1, a case for the phone is provided. In a step 2, a camera-flash hole is made through a back of the case. Steps 1 and 2 may be combined in a single step such as when the case is provided via injection molding. For injection molding, there is a mold of the case or a portion of the case. A liquid or uncured plastic is injected or poured into the mold along with a catalyst. The mold and plastic is subjected to a temperature to activate the catalyst and material. After a sufficient time for processing to occur, the mold can be opened, and the plastic case portion removed. The case portion can be cleaned and flashing removed. The mold used in the processing can include features (e.g., pattern or core) that will form features (e.g., camera-flash opening) of the case described in this application.

In a step 3, the dark-colored coloring is applied to the camera-flash hole. As discussed above, the dark-colored coloring may be applied to just the edging of the hole (FIG. 3), the edging and border of the hole on the case outside (FIG. 4), the edging and border of the hole on the case inside (FIG. 5), or edging and border of the hole on the case inside and outside (FIG. 6).

In a specific implementation, applying the dark-colored coloring involves a single technique such as applying black paint to the camera-flash opening or inserting a grommet into the camera-flash opening.

Alternatively, the application of the dark-colored coloring may involve a combination of techniques, i.e., two or more techniques. For example, black paint may be applied to the edging and a black color material such as a piece of rubber may be applied as a border around the camera-flash opening. The black color material may be a dark sticker or film having an adhesive back (i.e., pressure sensitive adhesive) so that the sticker can be fastened to a surface of the case around the camera-flash opening. The sticker may have a hole that is to be aligned with the camera-flash opening so that camera and flash of the phone can be exposed through the opening. Or the sticker may not have a hole. The sticker may be a continuous sheet of material that is placed over and covers the opening. Afterwards a blade is used to cut or punch a hole through the sticker so that the camera-flash opening of the case can be exposed or made visible.

Table A and the discussion accompanying table A above describes a proactive or positive technique of applying a dark-colored coloring to the camera-flash opening. However, in another specific implementation, the dark-colored coloring of the camera-flash opening is from leaving the opening untreated or is an act of omission. In this specific implementation, the original color of the case is black or another dark color. The surfaces of the case, but not the areas around the camera-flash opening, are made a light color. Thus, the areas around the camera-flash opening remain in the original black or dark color and the other case surfaces will be in the light color as a result of applying the light color. Table B below shows a specific implementation of a flow for making a case where the dark-colored coloring of the camera-flash opening is from leaving the opening untreated.

TABLE B

| Step 1 | Provide a black or dark-colored case. |
|---|---|
| Step 2 | Make a camera-flash hole through a back of the case. |
| Step 3 | Apply a light-colored coloring to the case, but not to the camera-flash hole. |

Steps 1 and 2 can be similar to steps 1 and 2 in table A above, but in this specific implementation, the case is provided as a dark-colored case. That is, the original starting material of the case is a dark color such as black (e.g., black plastic). In a step 3, a light-colored coloring (e.g., white paint) is applied to the case surfaces such as the outside case surface, inside case surface, or both, but the light-colored coloring is not applied to the camera-flash hole or opening.

Thus, the edging of the camera-flash opening, the outside border around the opening, the inside border around the opening, or combinations of these remain in the original dark color, but the other portions of the case will have been made a light color.

To help ensure that the light-colored coloring is not applied to the camera-flash opening, a mask, shield, template, or other covering can be applied to the opening so that the edging and other surfaces bordering the opening not intended to be made a light color are protected from the coloring process.

Alternatively, the camera-flash opening may be created after the light-colored coloring is applied to the originally black case. Upon creating the opening, the edging of the opening will be black because the original case material was black. The opening may be created by milling, drilling, or punching an opening through the back of the case.

The case can be manufactured to have any desired case color, and the camera-flash opening will have a darker color than the case color. This darker color will help prevent glare from the flash from affecting images and video captured by the camera lens. This opening with the darker color edging will eliminate or reduce glare from appearing in the pictures and video taken by a camera lens through this opening.

Colors of the visible spectrum (e.g., red, orange, yellow, green, blue, indigo, and violet) extend from about 390 nanometers to about 750 nanometers. Colors can further include unsaturated colors (e.g., nonspectral colors) that are mix of multiple wavelengths. The color white (e.g., 100 percent saturated white) is lighter than any color in the spectrum. The color black (e.g., 100 percent saturated black) is darker than any color in the spectrum.

Yellow is a color of the spectrum at about 570 nanometers to 590 nanometers. Generally, the colors above yellow, wavelengths from 590 nanometers to 750 nanometers (including orange and red), are considered progressively darker than yellow. For example, at the same or similar intensity level, red is considered darker than orange. Generally, the colors below yellow, wavelengths from 570 nanometers to 380 nanometers (including green, cyan, blue, and violet) are also considered progressively darker than yellow. For example, at the same or similar intensity level, blue is considered darker than cyan, which is darker than green, which is darker than yellow.

A color wheel is an arrangement of colors in a circle. Some color wheels have been developed by Sir Isaac Newton, Johann Wolfgang Goethe, Johannes Itten, and others. A color wheel can also be used to help determine whether a color is lighter or darker than another color. A color wheel is an arrangement of colors around a circle. Yellow is at one position in the circle. The color opposite (i.e., 180 degrees separation) of yellow is purple. Purple is a nonspectral color (a mixture red and violet) and is in the wheel between magenta and violet. Progressing clockwise around the color wheel from yellow toward purple, the arrangement of the colors include: yellow-orange, orange, red-orange, red, and red-purple or magenta. At the same or similar intensity level, the colors of the wheel become progressively darker from yellow to purple.

Progressing counterclockwise around the color wheel from yellow toward purple, the arrangement of the colors include: yellow-green, green, blue-green, blue, and blue-purple (or violet). As in the clockwise direction discussed above, at the same or similar intensity level, the colors of the wheel become progressively darker from yellow to purple.

Thus, whether a first color is lighter or darker than a second color can be determined by their positions on the color wheel with respect to yellow. The greater the degree of separation from yellow, the darker the color. For example, assume on the color wheel that a first degree of separation between yellow and a first color (e.g., orange) is about 60 degrees as measured in a clockwise direction from yellow to the first color. A second degree of separation between yellow and a second color (e.g., red) is about 120 degrees. The second degree of separation (120 degrees) is greater than the first degree of separation (60 degrees). So, the second color (red) is darker than the first color (orange).

A reference line from yellow to purple can divide the color wheel into first and second portions. The colors in the first portion can be the colors seen when progressing clockwise around the color wheel from yellow to purple, i.e., yellow-orange, orange, red-orange, red, and red-purple or magenta. The colors in the second portion can be the colors seen when progressing counterclockwise around the color wheel from yellow to purple, i.e., yellow-green, green, blue-green, blue, and blue-purple (or violet). Whether a color in the first portion is lighter or darker than a color in the second portion can also be determined by the degree of separation from yellow.

For example, assume that a first color is red-purple which is in the first portion of the color wheel. A second color is green which is in the second portion of the color wheel. A first degree of separation between yellow and the first color (red-purple) may be about 150 degrees (or positive 150 degrees) when measured clockwise from yellow to the first color. A second degree of separation between yellow and the second color (green) may be about −60 degrees (or minus 60 degrees) when measured counterclockwise from yellow to the second color. Thus, when the color is in the first portion of the color wheel, the degree of separation is measured in a clockwise direction from yellow. When the color is in the second portion of the color wheel, the degree of separation is measured in a counterclockwise direction from yellow. In this example, the first degree of separation (150 degrees) is greater than the second degree of separation (−60 degrees). So, the first color (red-purple) is darker than the second color (green).

Generally, the term "hue" is synonymous with color. Hue describes the distinct characteristic of color that distinguishes, for example, red from yellow from blue. Hues are dependent on the dominate wavelength of light that is emitted from an object. For example, blue objects emit light having wavelengths ranging from about 490 nanometers to about 450 nanometers. Red objects emit light having wavelengths ranging from about 700 nanometers to about 635 nanometers. Thus, the color of an object can be determined by the wavelength of light emitted from the object. In other words, the color of an object is considered "red" when the object reflects more of the "red" wavelength of light, i.e., wavelengths of about 700 nanometers as compared to other wavelengths. Specifically, the object is absorbing wavelengths of light except for wavelengths around 700 nanometers—which corresponds to the color red.

Although black, white, and gray are sometimes described as achromatic or hueless colors, a color may be referred to as "black" if it absorbs all frequencies of light. That is, an object that absorbs all wavelengths of light that strike it so that no parts of the spectrum are reflected is considered to be black. Black is darker than any color on the color wheel or spectrum. In contrast, white is lighter than any color on the color wheel or spectrum. If an object reflects all wavelengths of light equally, that object is considered to be white. Gray is an imperfect absorption of the light or a mixture of black and white.

In addition to hue, saturation or intensity is another dimension of color. Generally, for a given color, a more saturated version of the color can be better at reducing glare than a less saturated version of the color. So, in a specific implementation, for a given case color, the color is more saturated at the camera-flash opening as compared to the color at the case surface.

More particularly, saturation refers to the dominance of hue in a color. Saturation is the ratio of the dominant wavelength to other wavelengths in the color. Saturation can provide an indication of the amount of white or white pigment that is mixed in with the color. As the color becomes less saturated there will be more white. The color may be referred to as a tint, i.e., a variation of a color produced by adding white to it. Mixing in white with a color can make the color lighter. Mixing in black with a color can make the color darker. The resulting color may be referred to as a shade. When gray (i.e., black and white) is mixed with a color the resulting color may be referred to as a tone.

Thus, the intensity of a dark color can be mixed with white to make the color lighter. Conversely, a light color can be mixed with black to make the color darker. So, a case can be of a dark color that is mixed with white to lighten the dark color, the camera-flash opening can be of a saturated light color, and the camera-flash opening color can be darker than the case color because of the white used to lighten the case color. Similarly, the camera-flash opening can be of a light color that is mixed with black, the case can be of a dark color, and the camera-flash opening color will be darker than the case color because of the black used to darken the camera-flash opening.

For example, at the same or similar intensity level, red is darker than green. However, the intensity of red can be altered by mixing in white to lighten the red and make pink. Red, when mixed with white, can then be lighter than green. So, in a specific implementation, a red case includes a green camera-flash opening, where the red includes some white mixed in to make the red lighter than the green.

Some other examples of case color combinations where the intensity of a color is altered such as by mixing in white to lighten the case color (and thus provide a darker camera-flash opening) include: an orange case having a blue camera-flash opening; a purple case having a green camera-flash opening; a purple case having an orange camera-flash opening; an orange, case having a green camera-flash opening; a blue case having a green camera-flash opening; a red-orange case having a green camera-flash opening; a blue case having a yellow-green camera-flash opening; a red case having an orange camera-flash opening; a red case having a blue camera-flash opening; and a red-orange case having an orange camera-flash opening. For each of these cases, the case color is mixed with white so that the case color will be lighter than the color of the camera-flash opening. Conversely, the camera-flash opening will be darker than the case color.

In a specific implementation, a case is of a single color, e.g., red. The outside surface of the case has a first level of saturation of the color red. The camera-flash opening or edging has a second level of saturation of red. The second level of saturation is greater than the first level of saturation. In other words, the outside surface of the case has a greater amount of white mixed in with the red than the edging. Alternatively, the edging may be described as having a greater amount of red pigment than the outside surface of the case. In this specific implementation, the color of the camera-flash opening may be described as dark red and the outside case surface may be described as light red.

In another specific implementation, the color at the camera-flash opening has some black mixed in so as to darken the color at the opening. For example, a case may be of a single color such as orange, but at the camera-flash opening the orange color can be mixed with black to darken the orange color at the opening and reduce glare to pictures and video taken with the camera.

According to an aspect of the invention, generally, the edging of the camera-flash opening has a darker color than the case color, sufficient to eliminate or reduce glare from appearing in pictures or video taken with the camera lens through the opening. For example, the opening can be black and the case color can be any color on the color wheel or spectrum as black is darker than any color on the color wheel. A case can be in a light color (e.g., white or yellow) and the camera-flash opening can be black. The color at the opening can be pure black or a variation of black such as light black (i.e., have some white mixed in), gray, or charcoal. The case surface may be painted using a metallic paint so that it has iridescent and reflective properties, but such paint will not be applied to the camera-flash opening in order to prevent glare.

As discussed above, the amount of glare can depend on the specific color (and color properties or characteristics) selected for a case. Another factor that can contribute to glare is surface finish.

Generally, a roughened surface diffuses more light than a smooth surface. The rougher the surface, the more reflectivity is reduced. More specifically, light reflected from a surface includes a specular component and a diffuse component. The specular component is perceived as glare or can cause glare to appear in pictures and video taken by the camera. The sum of the specular reflectance and the diffuse reflectance is referred to as the total reflectance. For shiny surfaces, the specularly reflected light is relatively strong and the diffused light is weaker. On rough or low gloss surfaces, the specular component is weak and the diffused light is stronger.

Light reflecting off a mirror is an example of specular reflection. A mirror's reflectivity is typically about 85 percent, but can be more or less depending on the material, coating, and smoothness of the surface finish. The camera-flash opening of the case is designed so that its reflectivity will be less than that of the case surface to help reduce glare to pictures and video taken by the camera. For example, if the case surface reflects about 60 percent of the light, the reflectivity of the camera-flash opening (e.g., edging surface) will be less than 60 percent such as 10 percent. The edging surface may be referred to as being "darker" than the case surface because the edging surface reflects less light than the case surface.

One technique to reduce reflectivity is to roughen the surface. As discussed above, the rougher the surface, the more reflectivity is reduced. So, the camera-flash opening edging, border surface surrounding the opening, or both may be sanded (e.g., via sandpaper, sandblasting, or bead-blasting) to roughen the surface. That is, these regions near the opening will be treated or given a surface finish so that they will have less reflectivity as compared to the case outside surface, inside surface, or both. The camera-flash opening may be given a matte or flat finish which has a lower reflectivity than a mirror or gloss finish.

Other techniques to roughen include applying a chemical (e.g., an acid or solvent) to etch the case material surface. The surface may be roughened using a deposition process which may involve depositing and gluing small particles around the opening. There can be a spray or dip coating which upon drying will leave a roughened layer behind.

In this specific implementation, the camera-flash opening will have a higher surface roughness than the outside case surface, inside case surface, or both. Roughness is a measure of the texture of a surface. It can be quantified by the vertical deviations of a real surface from its ideal form. If these deviations are large, the surface is rough; if they are small the surface is smooth.

The camera-flash opening may instead or additionally be treated with an antireflective coating to reduce reflection and thus glare to pictures and video taken by the camera. When light moves from one medium to another (such as when light enters a sheet of glass after traveling through air), some portion of the light is reflected from the surface (referred to as the interface) between the two media. A thin layer of material at the interface and having an index of refraction between those of the two media can be used to reduce reflection.

In a specific implementation, to reduce glare, the camera-flash opening such as the edging surface is treated so that it is less reflective than, for example, the outside case surface. According to an aspect of the invention, generally, an edging of the camera-flash opening has a lower reflectivity than a reflectivity of the case, sufficient to eliminate or reduce glare from appearing in pictures or video taken with the camera lens through the opening.

The amount of specular light reflected off the edging surface from a light source is less than an amount of specular light reflected off the outside case surface. Alternatively, the amount of diffuse light reflected off the edging surface from the light source is greater than an amount of diffuse light reflected off the outside surface from the light source. Specular reflection measurements may be made using a specular glossmeter. In a specific implementation, the reflectivity of the case at the camera-flash opening is reduced such as via a matte finish to a level sufficient to prevent or reduce glare to the pictures and video taken with the camera.

Thus, in addition to color, other techniques to reduce glare include providing a particular surface characteristic, texture, or finish such as by roughening the surface to increase the light absorbing or light diffusing quality of the camera-flash opening, applying an antiglare or antireflective coating, or combinations of these.

The case colors may be specified using a color space system or standard. Some examples of color space systems include the Pantone Matching System (PMS), Pantone Plastics color system, the Munsell color system, the ICI Colour Dimensions Colour Atlas by the Imperial Chemical Industries Plc of London, CIE 1931 XYZ color space, created by the International Commission on Illumination (CIE), the CIE 1976 (L*, u*, v*) color space, the Hunter L,a,b color space, and others. A color space or color model is a system for describing color numerically.

For example, the Hunter L,a,b color space or scale is a three-dimensional rectangular color space based on the opponent-colors theory. The "L" value indicates the lightness of a color. The "L" value can range from 0 to 100 where 0 is black and 100 is white. The "a" value indicates the color's position between red and green. Positive "a" values are red; negative values are green, and 0 is neutral. The "b" value indicates the color's position between yellow and blue. Positive "b" values are yellow; negative values are blue; and 0 is neutral.

A color's lightness value can be measured using a color measurement tool such as a spectrophotometer or colorimeter. Specifically, the CIE lightness value can provide an indication of the amount of glare where high lightness values can indicate more glare than low lightness values. Colors having low lightness values can generally be described as dark colors. Colors having high lightness values can generally be described as light colors. Generally, the case colors will be selected so that the color of the camera-flash opening has a lower lightness value than the case surface in order to prevent or reduce glare to pictures and video taken by the camera.

The color measurements may be done at any point or location on the case. In a specific implementation, a first measurement reference point on the outside case surface is selected such that the color at that selected point is the most light as compared to other points on the outside case surface (e.g., has the most white as compared to other regions or areas on the outside case surface). For example, if the outside case surface has a pattern that includes regions of white and regions of black, in this specific implementation, the selected reference point will be within a white region. A second measurement reference point is at the camera-flash opening such as within the edging of the camera-flash opening. The color at the second reference point is darker than the color at the first reference point.

In various implementations, a technique to reduce glare may include a painted inner ring, using an insert mold, a co-molded ring with body form, or a snap in ring where a secondary lens may be applied, or combinations of these. The secondary lens can be polarized lens (e.g., a polarized lens filter) to help reduce glare.

Figure 11:
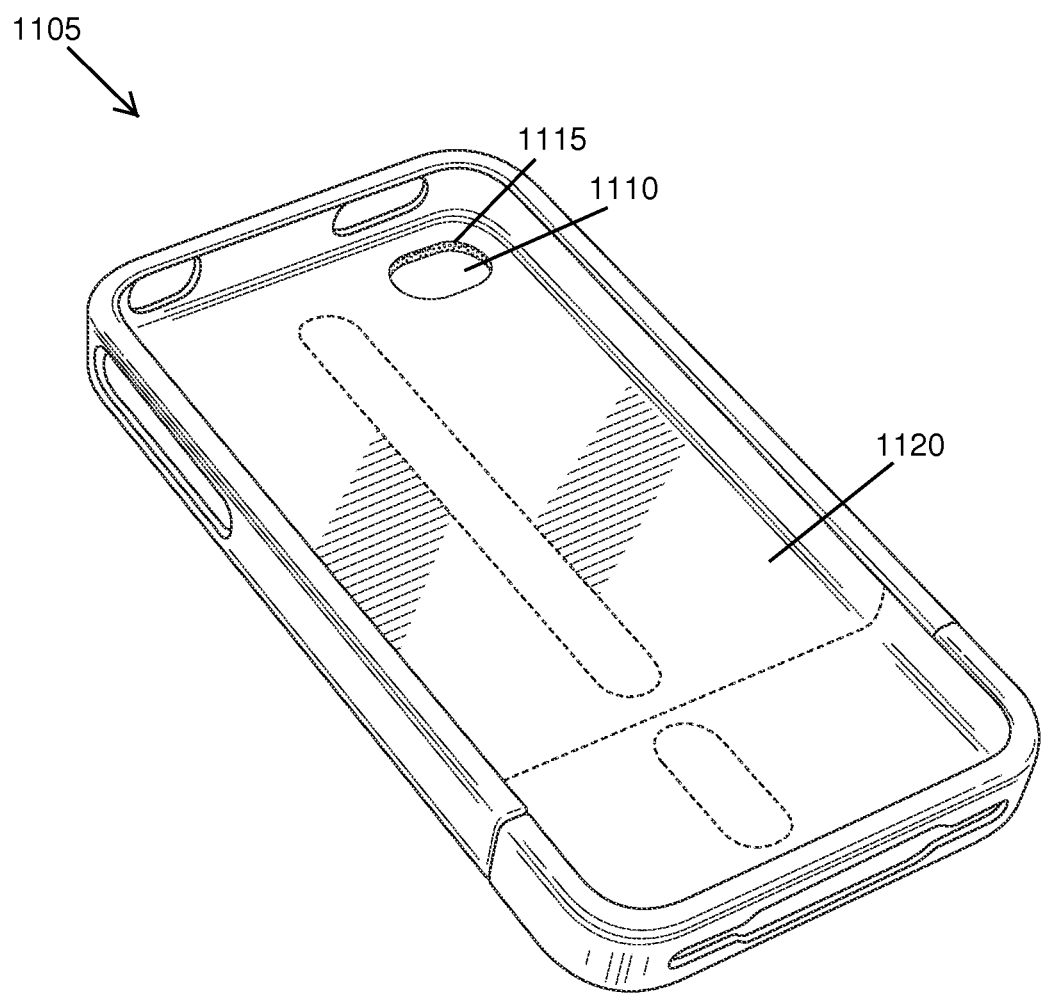
FIG. 11 shows a front perspective view of a specific implementation of a case having a camera-flash opening with a glare-reducing feature.

FIG. 11 shows a perspective view of a specific implementation of a case 1105. The case includes a camera-flash opening 1110 which includes a hole through the back of the case. The hole extends from the outside case surface to the inside case surface. The camera-flash opening has an edge or edging 1115 that has a dark-colored coloring, e.g., is colored black or another dark color to prevent or reduce glare to pictures and video taken by the camera. The edging is between the outside and inside case surfaces. The camera-flash opening has a length dimension that is greater than a width dimension of the opening. A front opening 1120 of the case allows a screen 1012 (FIG. 10) of the phone to be accessed. The case may further include other openings so that other features or controls of the phone can be accessed while the phone remains protected in the case.

Figure 12:
FIG. 12 shows a back perspective view of the case.
Figure 13:
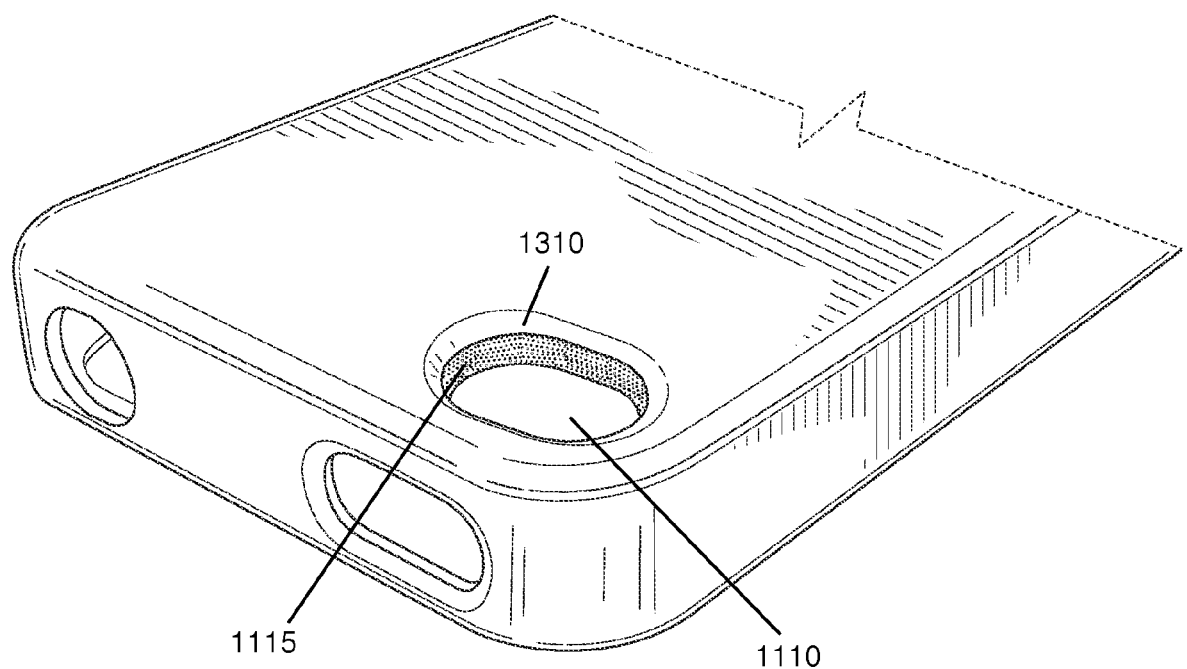
FIG. 13 shows a close-up view of the back of the case at the camera-flash opening.

FIG. 12 shows a perspective view of a back of the case shown in FIG. 11. FIG. 13 shows a close-up perspective view of a corner of the case where the camera-flash opening is located.

The opening includes a bevel 1310 on the outside of the case. The bevel may be referred to as a lens hood. The bevel is sloped or angled down towards hole to help direct light away from the camera that would otherwise appear as glare in pictures and video. In this specific implementation, the bevel has not been treated with the dark coloring. In another specific implementation, the lens hood (along with the edging of the opening) is treated with the dark coloring.

Figure 14:
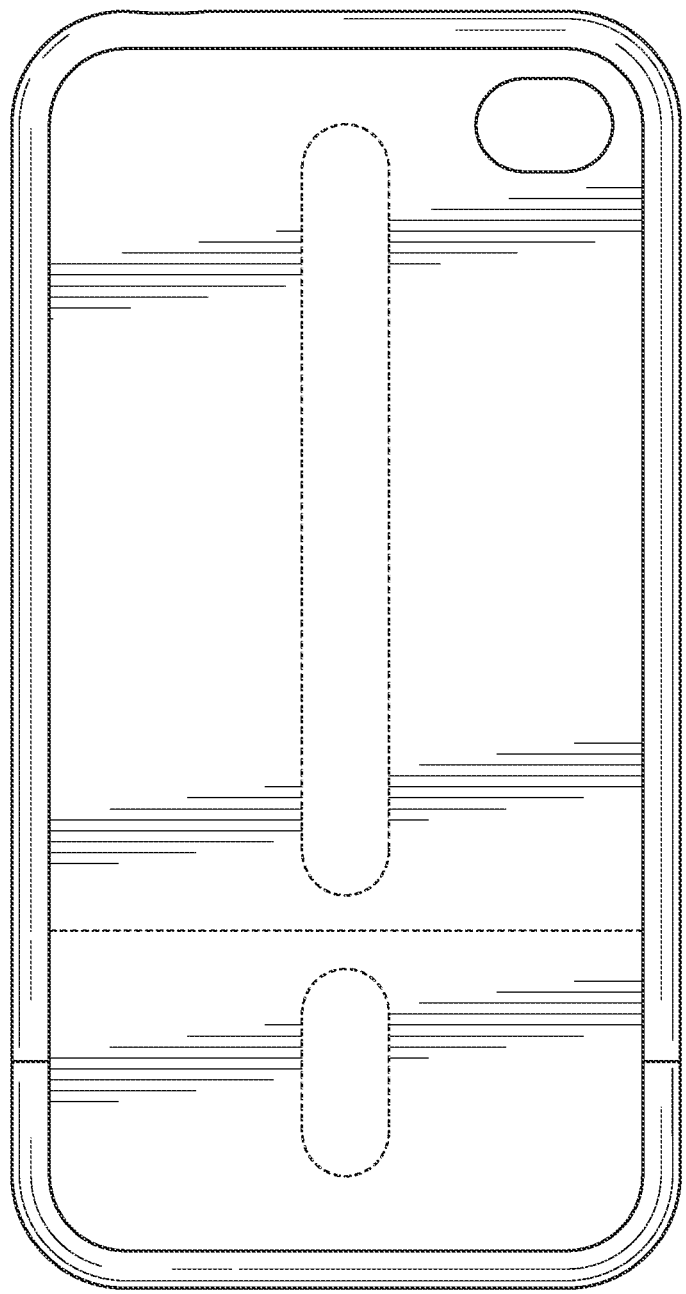
FIG. 14 shows a front view of the specific implementation of the case.
Figure 15:
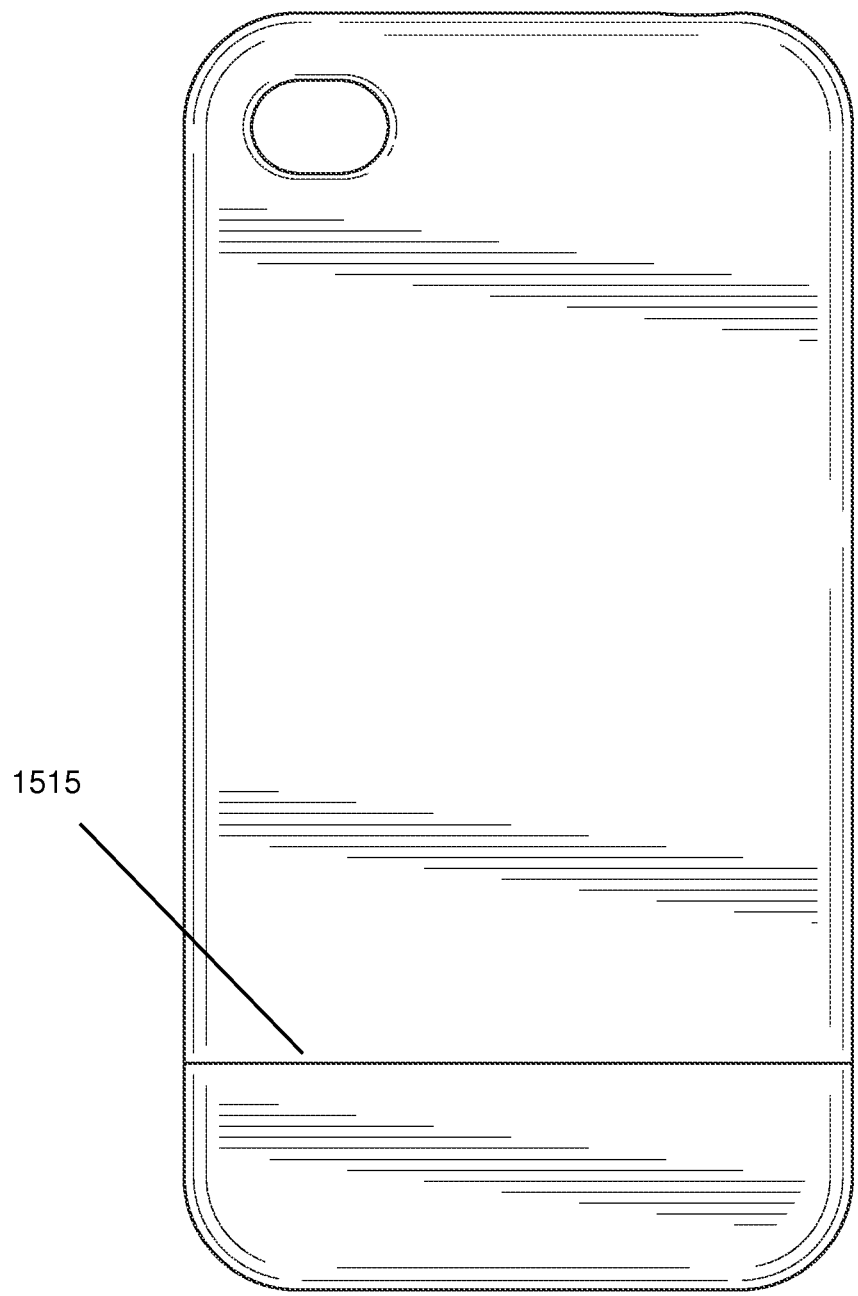
FIG. 15 shows a back view of the case.
Figure 16:
FIG. 16 shows a left side view of the case.
Figure 17:
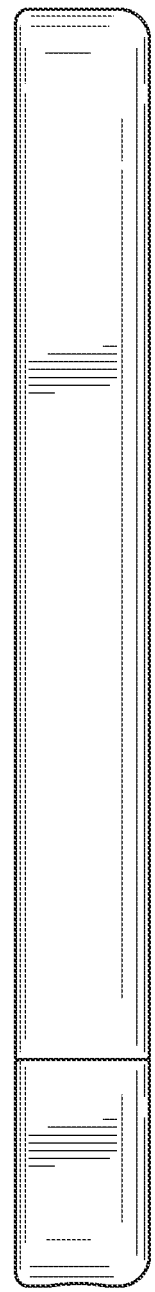
FIG. 17 shows a right side view of the case.
Figure 18:
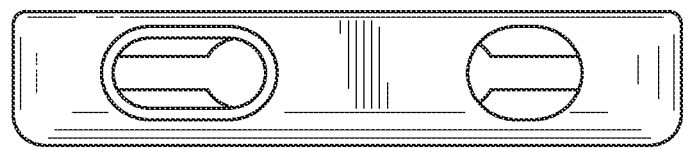
FIG. 18 shows a top view of the case.
Figure 19:
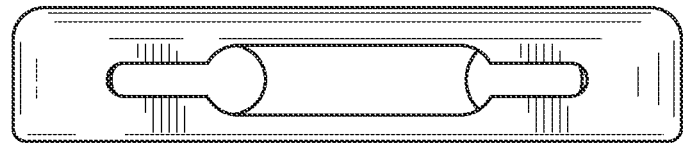
FIG. 19 shows a bottom view of the case.
Figure 20:
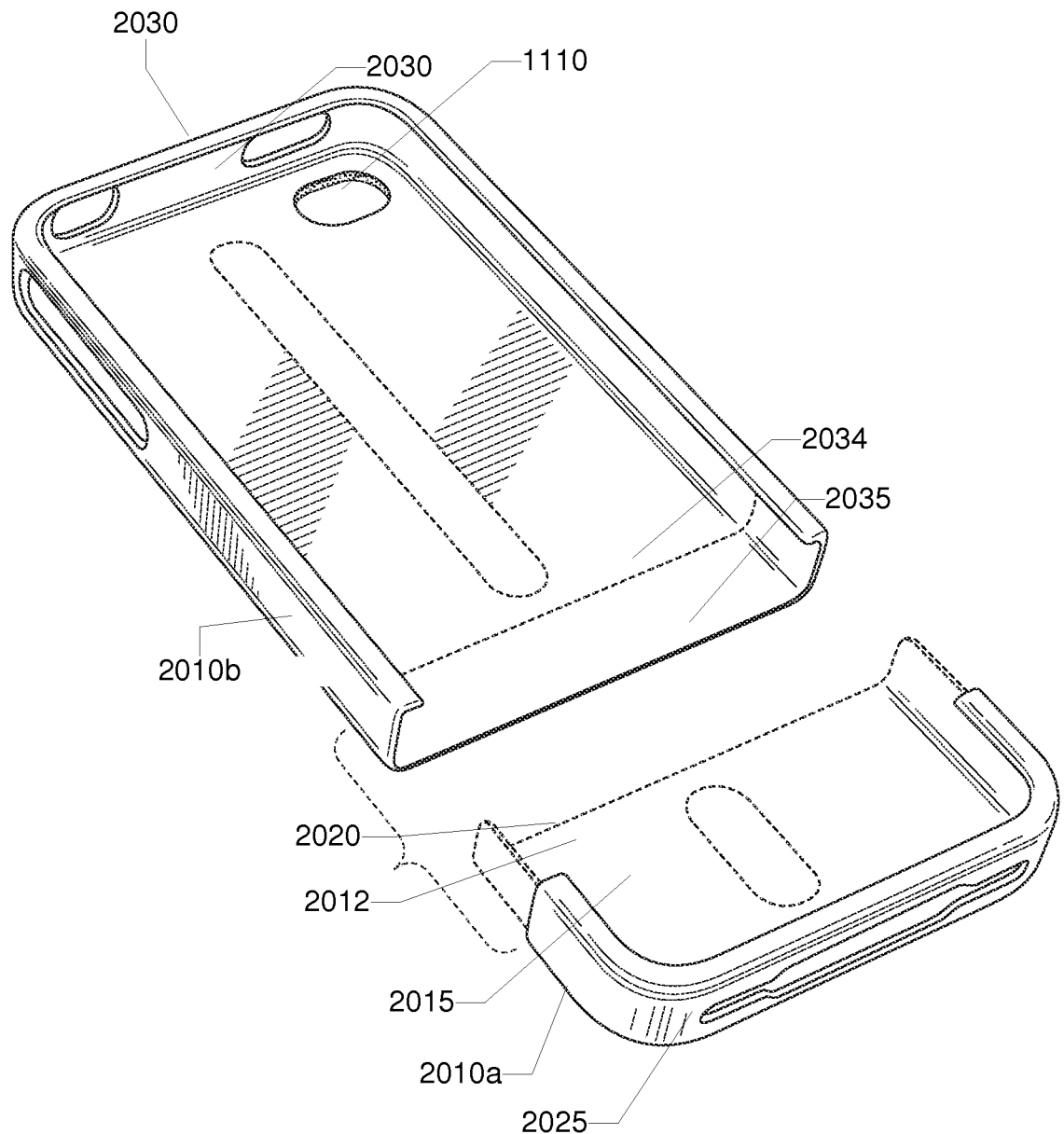
FIG. 20 shows a front perspective view of the case in a disassembled position.
Figure 21:
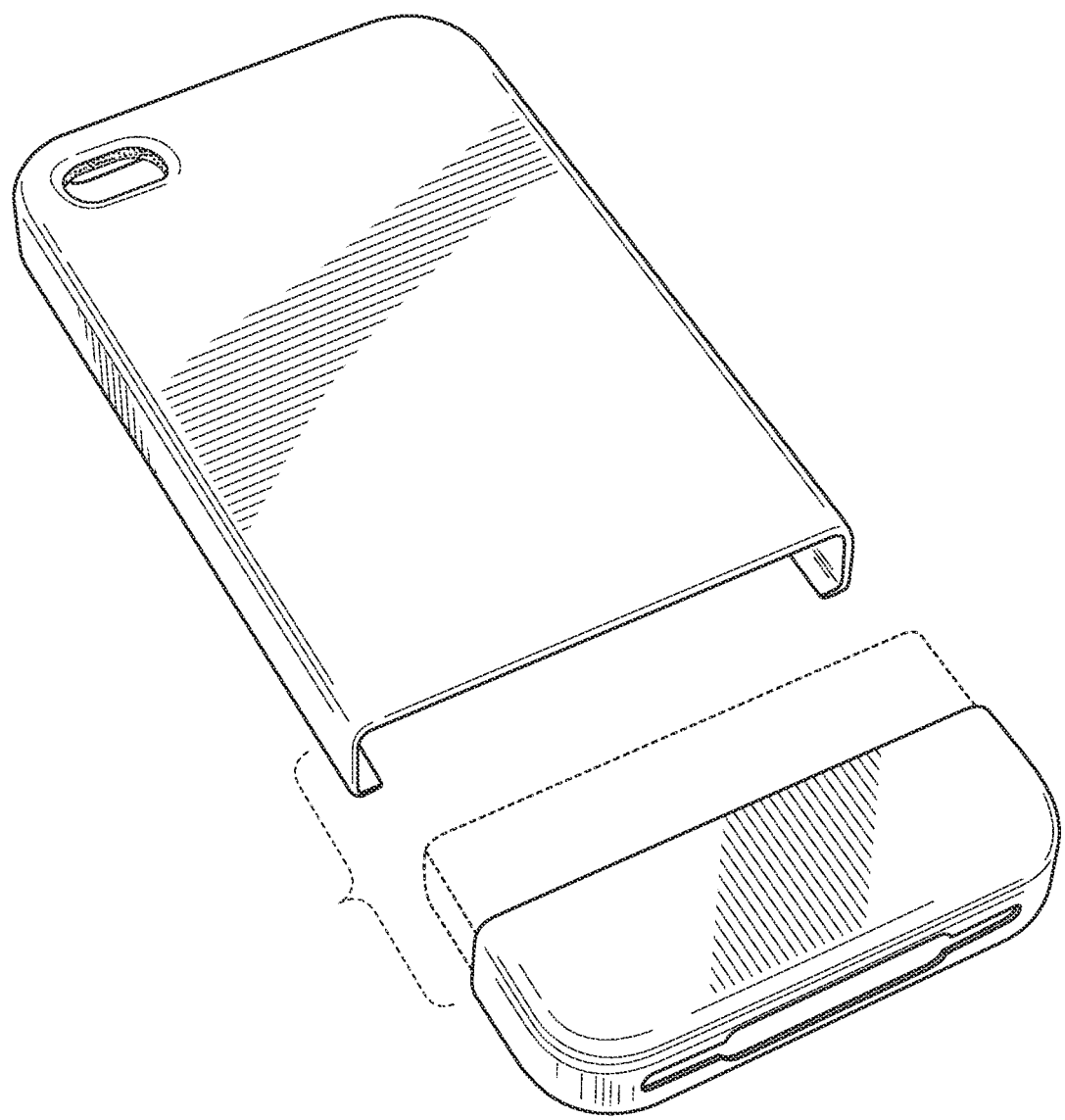
FIG. 21 shows a back perspective view of the case in the disassembled position.
Figure 22:
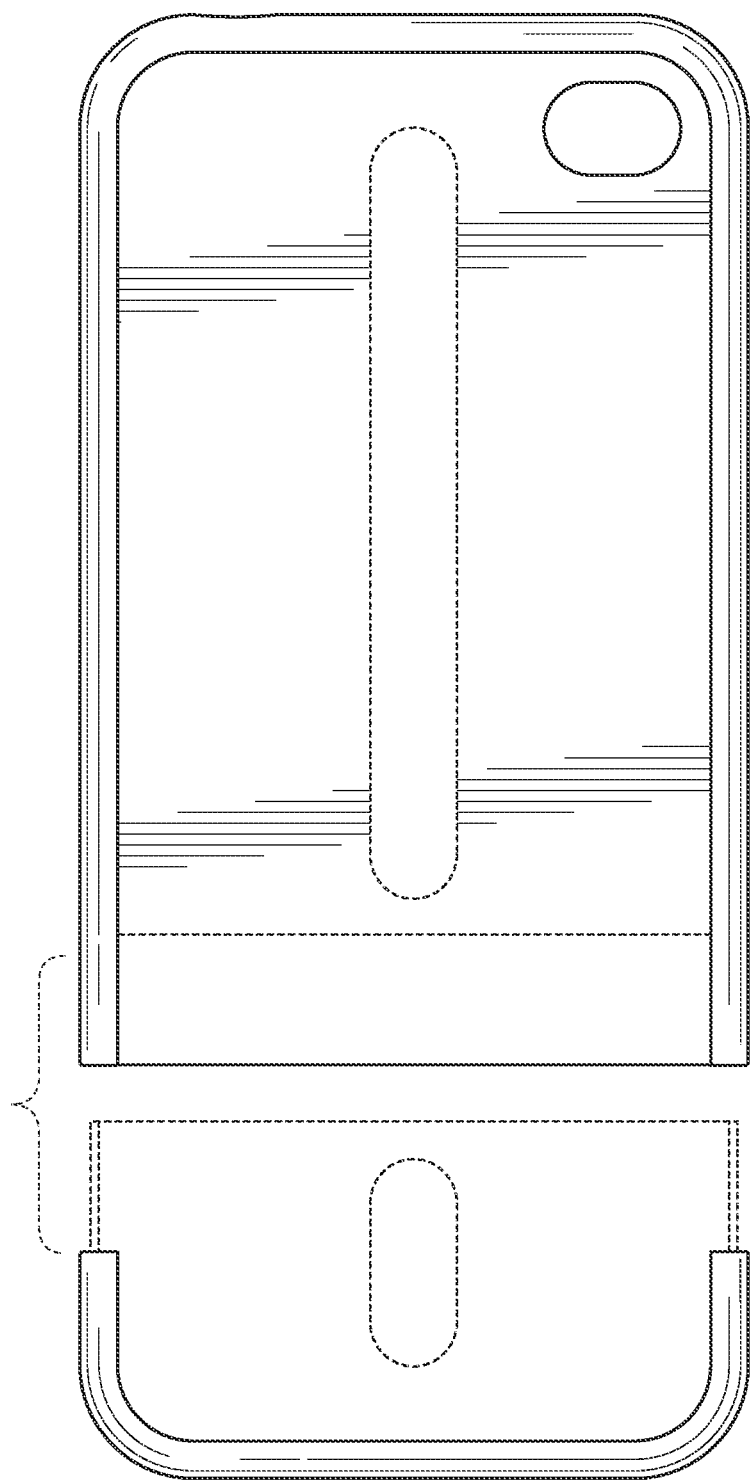
FIG. 22 shows a front view of the case in the disassembled position.
Figure 23:
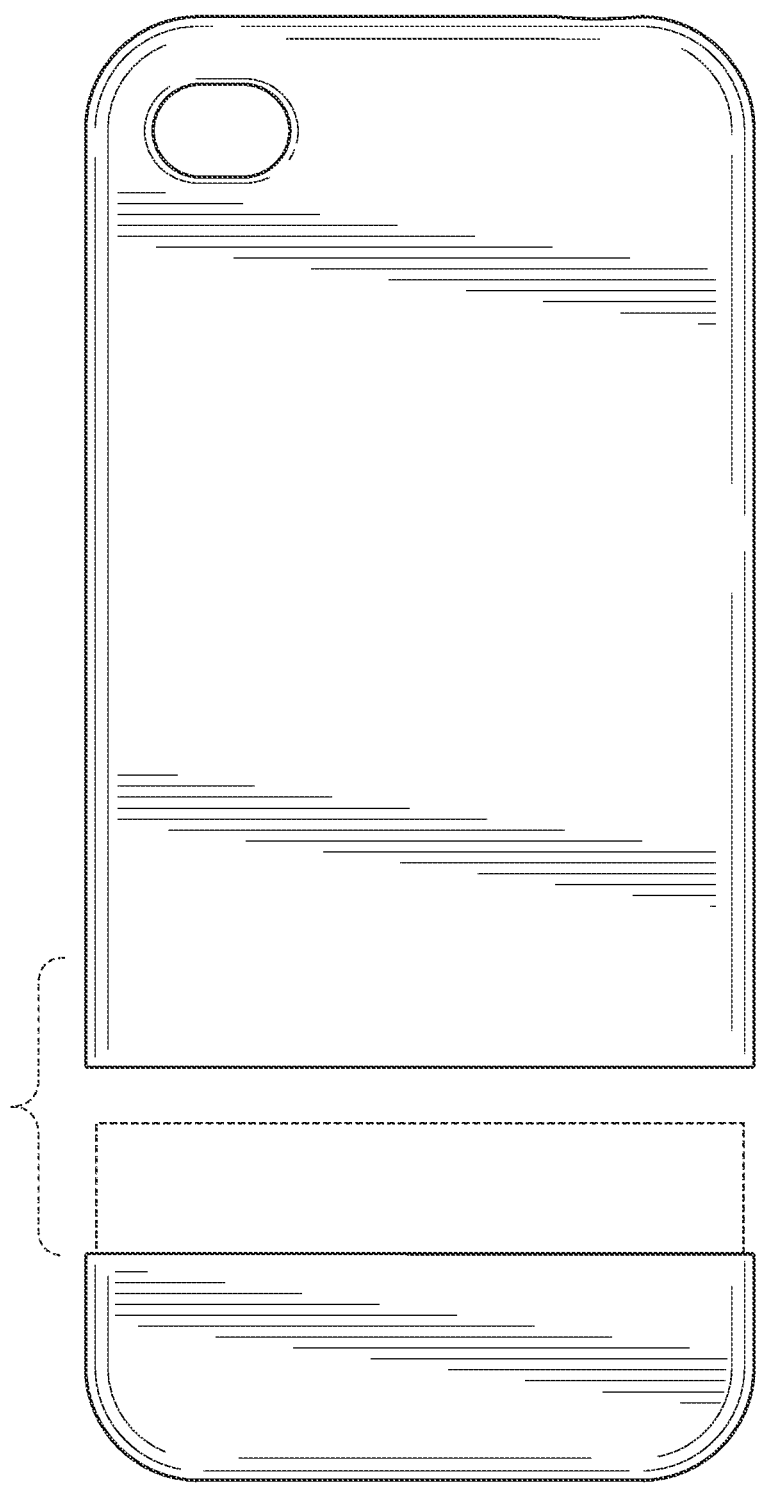
FIG. 23 shows a back view of the case in the disassembled position.
Figure 24:
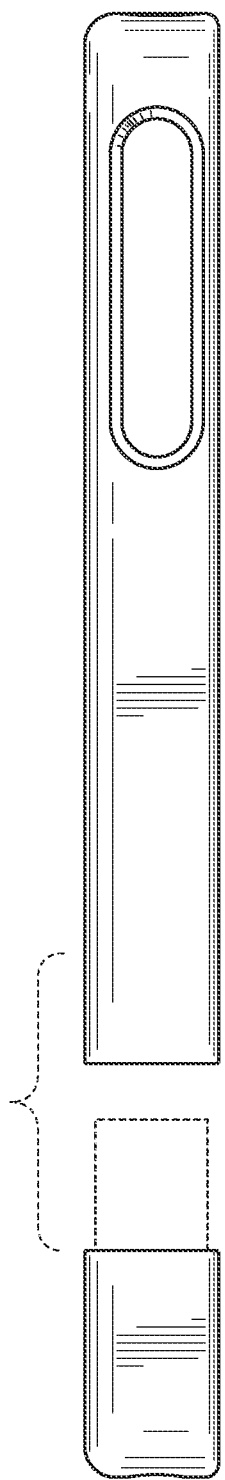
FIG. 24 shows a left side view of the case in the disassembled position.
Figure 25:
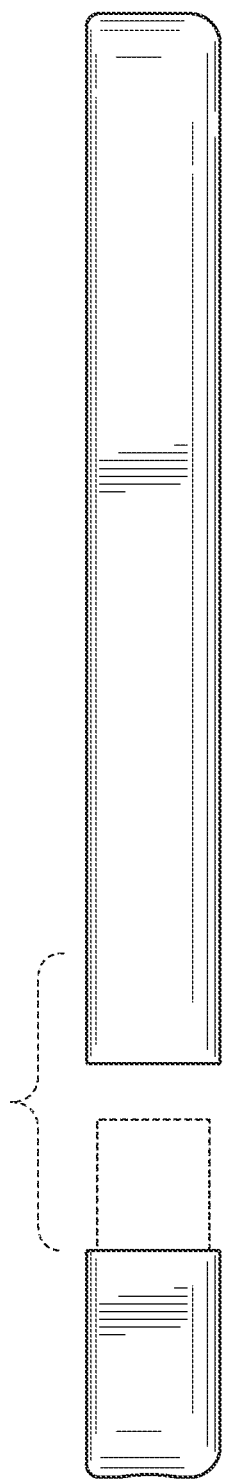
FIG. 25 shows a right side view of the case in the disassembled position.

FIGS. 14-25 show some other views of case 1105. FIG. 14 shows a front view of the case. FIG. 15 shows a back view of the case. FIG. 16 shows a left side view of the case. FIG. 17 shows a right side view of the case. FIG. 18 shows a top view of the case. FIG. 19 shows a bottom view of the case. FIG. 20 shows a perspective of a front view the case in a disassembled position. FIG. 21 shows a perspective of a back view of the case in the disassembled position. FIG. 22 shows a front view of the case in the disassembled position. FIG. 23 shows a back view of the case in the disassembled position. FIG. 24 shows a left side view of the case in the disassembled position. FIG. 25 shows a right side view of the case in the disassembled position.

Referring now to FIG. 20, this case includes a first or lower case portion 2010a and a second or upper case portion 2010b. The first case portion includes a first open-shaped opening 2012, and a first base surface 2015 upon which a back of a housing of the electronic device will be placed against. The first base surface includes a top edge 2020 and a lower sidewall 2025, connected to the first base surface at an end opposite of the top edge, that will be positioned against a bottom side edge of the electronic device.

The second case portion includes an upper sidewall 2030 that will be positioned against a top side edge of the electronic device when the second case portion is seated against the first case portion. The second case portion further includes a second open-shaped opening 2034, and an open side end 2035, opposite the upper sidewall. The second case portion slides onto the first case portion through the open side end. When the second case portion is seated against the first case portion, the first and second case portions meet at and form a seam 1510 (FIG. 15) which extends across a back and sides of the case as shown in FIGS. 15-17. This seam and the location of the seam is further discussed in U.S. Pat. No. 7,612,997, issued Nov. 3, 2009 and U.S. patent application Ser. No. 12/847,887, filed Jul. 30, 2010 which are incorporated by reference.

When the second case portion is seated against the first case portion, the first open-shaped opening for the first case portion merges with the second open-shaped opening for the second case portion to form front opening 1120 (FIG. 11) of the case through which a screen 1010 of the electronic device (FIG. 10) will be visible. The front opening has a closed shape. Similarly, the camera-flash opening or back opening has a closed shape through which a camera flash and camera lens of the electronic device will be visible.

In this specific implementation, as shown in FIG. 20, camera-flash opening 1110 is in second or upper case portion. However, this location can change depending upon, for example, the location of the seam as described in U.S. Pat. No. 7,612,997 and U.S. patent application Ser. No. 12/847, 887. Thus, in another specific implementation, the camera-flash opening is in the first or lower case portion.

The camera-flash opening has generally an oval or obround shape. The shape may be formed from two semicircles that are joined together using two parallel lines. However, the camera-flash opening shown in the case of FIGS. 11-25 is merely one example of an opening that can be used.

In other case embodiments, the camera-flash opening (or openings) may have different shapes or arrangements. For example, FIGS. 26-31 show a variety of camera and flash-hole options for a case. Specifically, FIG. 26 shows a back of a case having camera-flash opening for the camera and flash of the phone which the case holds. A detail section D6 indicates a shape of the opening. The detail section may have any of the opening options shown in FIGS. 27-31.

FIG. 27 shows a first opening arrangement that has a single opening having an oval or obround shape. FIG. 28 shows a second opening arrangement that has a single opening having a tear drop or egg-shaped shape (or shape like an outline of a belt going around a large gear and a small gear). FIGS. 29-30 show a third and fourth opening arrangement that has a single opening having a keyhole shape, being larger around the camera lens and smaller around the flash. FIG. 31 shows a fifth opening arrangement that has two circular openings, one large circular opening for the camera lens and a smaller circular opening for the flash.

There are other possible opening arrangements and shapes including polygonal, triangular, square, rectangular, rounded rectangular, triangular, hexagonal, octagonal, and so forth. Opening shapes and arrangements are further discussed in U.S. patent application Ser. No. 12/847,887, filed Jul. 30, 2010, which is incorporated by reference. Aspects and principles of the invention are applicable to the camera-flash opening arrangements presented in this application and also to other arrangements not specifically discussed. Any opening arrangement in FIGS. 27-31 and described above can be used for the case in FIGS. 11-25, and also for other portable electronic device cases.

FIG. 32 shows a back of a case with a camera-flash opening 3210 where the camera and flash of the phone (shown in the figure as circles with a broken line) are exposed through the opening. A section line A-A has been drawn through opening 3210 or the camera hole to indicate some camera hole edge treatment options as shown in the section views of FIGS. 33-40. A case regardless of what material the case is made of can have any of the edge treatment options shown in FIGS. 33-40.

FIGS. 33-34 show a painted black or other dark color treatment option applied to the camera-flash opening. The treatment options are indicated in the figures as dark heavily shaded lines or blocks. Specifically, FIG. 33 shows a first treatment option where an edge of the opening and an inside border surrounding the opening has been painted black. FIG. 34 shows a second treatment option where the edge of the camera opening has been painted black, but the inside and outside surfaces of the case surrounding the opening has not been painted black.

FIGS. 35-40 show camera hole treatment options where an insert or overmold is used. In a specific implementation, the dark heavily shaded blocks in FIGS. 35-40 indicate a black or dark colored insert or a glued or snapped in piece that may be TPU, TPE, TPR, silicon, or others as discussed above. In another specific implementation, the dark heavily shaded blocks in FIGS. 35-40 indicate an overmold. More specifically, FIG. 35 shows a third treatment option where a black or dark colored material has been applied to just the edge of the camera hole.

FIG. 36 shows a fourth treatment option where a case material edge of the opening has been sloped and a dark colored material has been applied to the sloped case material edge. The slope is angled so that when viewing the opening from the inside of the case towards the outside of the case and without the dark colored material, the case material edge slopes towards the outside or converges towards the outside. In other words, the opening becomes smaller or narrows as one moves from the inside of the case and towards the outside of the case. When the dark colored material is attached to the sloped case material edges a large area of the dark colored material (or border) will be facing the inside of the case (i.e., facing towards the flash) to help prevent the flash from bouncing off the inside of the case.

In another specific implementation, the slope of the case material edge is reversed from that shown in FIG. 36. That is, the size or area of the case material hole increases or enlarges as one moves from the inside of the case and towards the outside. In this specific implementation, when the dark colored material is attached to the sloped case material edges a large area of the dark colored material (or border) will be facing the outside of the case (i.e., facing away from the flash) to help prevent glare on the outside of the case.

Another benefit of sloping the case material camera-flash opening before applying the dark material is to provide more surface area as compared to a nonsloped or straight case material opening. The additional surface area can help to improve the bond between the case material and the dark material so that the dark material does not accidentally separate from the case.

In the implementations shown in FIGS. 33-35, the camera-flash opening (or rather the finished camera-flash opening) has a 0-degree slope, which means the edging is transverse or perpendicular to the plane of the phone and flash. Another technique to reduce glare is to manufacture the slope to be greater than 0 degrees, so that the opening has a concave edging (when viewed from the outside of the back side of the case). This can also be done by using a black or dark color material in the edging of the camera-flash opening. This dark material can alter the slope (from the original camera-flash opening edging). The dark coloring material can be overmolded, inserted, glued, or snapped in place (or any combination of these) on the case. The dark coloring material can be the same material as the other case material, or the dark coloring material may be a different material from the other case material.

For example, FIG. 37 shows a fifth treatment option where a dark colored material attached to the camera hole edge has a sloped face or edging. That is the slope is greater than 0 degrees. This sloping can help to reduce glare and provide good illumination of the camera subjects via the flash.

Generally, as light leaves a light source such as a flash, the light spreads out like a cone. That is, as the light photons leave the flash, the photons start to spread out in a cone-shaped beam or radiate outwards. So, sloping the edging of the camera-flash opening helps to reduce the amount of spreading photons or light rays which strike the edging surface of the camera-flash opening. These light rays, instead of illuminating the camera subjects, may instead be reflected back towards the camera and appear as glare in pictures and video taken by the camera.

Further, with the sloped edging, less of the spreading light rays will be blocked by the opening edging which means more light will reach the camera subjects. With more light reaching the subjects, the subjects will be better illuminated.

As the angle of the edging slope increases the likelihood of light reflecting back and causing glare may be reduced. For example, the law of reflection states that the angle of incidence is equal to the angle of reflection. Specifically, a ray of light approaching a surface may be referred to as the incident light ray. The ray of light that reflects off the surface may be referred to as the reflected light ray. At the point of incidence, i.e., where the incident light ray strikes the surface, a line can be drawn perpendicular to the surface. This line may be referred to as the normal line. The normal line divides the angle between the incident light ray and the reflected light ray into two equal angles. The angle between the incident ray and the normal may be referred to as the angle of incidence. The angle between the reflected light ray and the normal may be referred to as the angle of reflection, which is equal to the angle of incidence.

So, for edging having a 0 degree slope, when an incident light ray approaches the edging and strikes the edging at, for example, an angle of incidence of 45 degrees, the reflected light ray will have an angle of reflection of 45 degrees and may be directed towards the camera lens. The reflected light ray may then appear as glare in pictures and video taken by the camera. However, with a sloped edging the incident light ray will have a different angle of incidence and angle of reflection. With the sloped edging, the reflected light ray can be directed away from the camera lens so that glare to pictures and video taken by the camera can be prevented or reduced.

The angle of the slope can range from about 5 degrees to about 60 degrees including, for example, about 10, 20, 30, 45, or more than 60 degrees as measured from a horizontal line perpendicular to the opening. The angle may be less than 5 degrees. The particular angle of the slope can depend on factors such as the angle of the flash's reflector, the design of the flash and camera, the camera lens aperture, and so forth.

In an implementation, the thickness of the case can be altered to reduce glare. Under some conditions a thicker case is more effective at reducing glare issues than a thinner case. When a thicker thickness is used, the slope of the camera-flash opening edging can be altered to make it more concave as shown in FIG. 37, which will reduce glare issues. That is, the thicker case can have a sloped edging, i.e., an edging having a slope greater than 0 degrees, where the sloped edging acts as a lens hood. A lens hood helps to prevent or reduce glare by preventing undesirable light (e.g., lens flare) from entering the camera lens. Lens flare can be created when a very bright light, such as bright sunlight, enters the camera lens and hits the camera's sensor. This can cause undesirable bright streaks to appear in pictures and video taken by the camera.

Under other conditions, a thinner thickness can reduce glare. The case may be made to be thinner at the camera-flash opening region to reduce glare and thicker elsewhere to strengthen the case. Whether to use a thicker case or a thinner case can depend on factors such as the type of camera lens, e.g., wide angle lens versus telephoto lens. For example, a thick case can allow for a wide lens hood. But, when such a hood is used with a telephoto lens, the wide hood may not be able to prevent lens flare. So, it can be desirable to select a case thickness based on the type of camera lens.

FIG. 38 shows a sixth treatment option where the case material opening or hole has a countersink or depression on the inside of the case. This allows a dark colored material having a flange (e.g., insert or grommet) to be inserted into the hole such that the flange is recessed into the countersink and lies flush with the inside surface of the case.

Because of the countersink, the flange does not protrude past the inside surface of the case so that the back of the camera can be placed very close to the inside of the case. This helps to give the case a form factor or size that is very close to the form factor of the phone. In another specific implementation, the case is designed so that the flange does protrude past the inside surface of the case. This can allow the flange to contact the phone and make a seal around the flash of the phone. The sealing provided by the flange can help to prevent the light from escaping and bouncing off the inside of the phone.

Although FIG. 38 shows the countersink on the inside of the case, in another specific implementation, the countersink is on the outside of the case when, for example, the flange is to be on the outside of the case.

FIG. 39 shows a seventh treatment option where a dark colored material for the case camera-flash opening has an edging that is rounded, curved, or convex. Rounding the edging can further reduce glare and help prevent the spreading light rays from the flash from being blocked at the opening. See discussion on sloped edging above.

FIG. 40 shows a seventh treatment option where a dark colored material (or portions of the dark colored material) are recessed into a first countersink or depression on the outside of the case, and a second counter sink or depression on the inside of the case. In a specific implementation, the dark colored material is a grommet having a tubular body portion, a first flange connected to an end of the tubular body portion, and a second flange connected to an opposite end of the tubular body portion. The first flange is recessed into the first countersink and the second flange is recessed into the second counter sink.

In this specific implementation, the area of the first countersink (or first flange) is less than the area of the second countersink (or second flange). In other words, there is a greater area or amount of the black material on the inside of the case as compared to the outside of the case. This implementation may be appropriate where it is likely that there will be more glare that results from light bouncing off the inside of the case as compared to the outside of the case, such as when there is a large gap between the back of the phone and the inside of the case.

In another specific implementation, the area of the first countersink (or first flange) is greater than the area of the second countersink (or second flange). In other words, there is a greater area or amount of the black material on the outside of the case as compared to the inside of the case. This implementation may be appropriate where it is likely that there will be more glare that results from light outside of the case as compared to the inside of the case.

In another specific implementation, the areas of the first and second countersinks or flanges are the same.

Any of the treatment options shown in FIGS. 33-40 and described above can be used with any of the opening arrangements shown in FIGS. 27-31.

FIGS. 11-25 show merely one specific implementation of a case with a camera-flash opening having features to prevent or reduce glare. The case is of a two-piece design. However, as one of skill in the art would recognize, a case can be of a single-piece or one-piece design. With a single-piece case design the case can be designed to snap onto a back of the phone. Further, in a specific implementation, the case will include a battery, enclosed between the base back surface and the back of the case to lengthen a battery life of the device. A battery case is described in U.S. Pat. No. 7,612,997, issued Nov. 3, 2009, which is incorporated by reference.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A case for an electronic device comprising:
    a first case portion comprising:
        a first base surface upon which a back of a housing of the electronic device will be placed against, wherein the base surface comprises a top edge;
        a lower sidewall, connected to the first base surface at an end opposite of the top edge, that will be positioned against a bottom side edge of the electronic device;
    a second case portion comprising:
        an upper sidewall that will be positioned against a top side edge of the electronic device when the second case portion is seated against the first case portion; and
        an open side end, opposite the upper sidewall, wherein the second case portion slides onto the first case portion through the open side end,
    wherein when the second case portion is seated against the first case portion, the first and second case portions meet at and form a seam which extends across a back of the case, and
    a camera-flash opening, comprising a hole through the back of the case, wherein the camera-flash opening has a length dimension greater than a width dimension, and an edging of the camera-flash opening comprises a first color that is darker than a second color of the back of the case;
    when the second case portion is seated against the first case portion, a first open-shaped opening for the first case portion merges with a second open-shaped opening for the second case portion to form a front opening of the case through which a screen of the electronic device will be visible, the front opening having a closed shape, and
    the back opening has a closed shape through which a camera flash and camera lens of the electronic device will be visible.

2. The case of claim 1 wherein the first color comprises a black pigment.

3. The case of claim 1 wherein the first color comprises a shade of gray sufficient to prevent glare.

4. The case of claim 1 wherein the first color is formed by a first material overmolded on edging of camera-flash opening.

5. The case of claim 1 wherein the first color is formed by a first material inserted into the camera-flash opening.

6. The case of claim 1 wherein the first color is formed by a first material glued to the camera-flash opening.

7. The case of claim 1 wherein the first color comprises a black pigment, and the black pigment is further applied as a border around the camera-flash opening on an inside of the case.

8. The case of claim 1 wherein the edging has a slope of greater than 0.

9. The case of claim 1 wherein the first color is formed by a material formed on the back of the case, forming the edging of the camera-flash opening having a slope greater than 0.

10. The case of claim 1 wherein the second color is white and the first color is black.

11. A case for an electronic device comprising:
    a first base surface upon which a back of a housing of the electronic device will be placed against; and
    a camera-flash opening, comprising a hole through a back of the case comprising a back case color, wherein the camera-flash opening has a length dimension greater than a width dimension, a first material comprising a flash opening color is overmolded on an edging of the camera-flash opening, and the flash opening color is darker than the back case color, and
    the camera-flash opening has a closed shape through which a camera flash and camera lens of the electronic device will be visible.

12. The case of claim 11 comprising:
    a battery, enclosed between the first base surface and the back of the case.

13. The case of claim 11 wherein a slope of the edging of the camera-flash opening is greater than 0.

14. A method of making a case for an electronic device comprising:
    forming a back of the electronic device case having an inside surface and outside surface, wherein the electronic device case is adapted to hold an electronic device comprising a camera flash on its back surface, and a touch screen;
    forming a camera-flash opening in the back of the case, wherein the camera-flash opening extends from the inside surface to the outside surface, and the camera-flash opening of the case is positioned so a flash emitted by the camera flash of the electronic device passes through the camera-flash opening; and
    forming a dark coloring on an edging of the camera-flash opening of the case by overmolding a first material comprising the dark coloring on the edging of the camera-flash opening.

15. The method of claim 14 wherein the dark coloring of the first material comprises a black pigment.

16. The method of claim 14 wherein the back of the electronic device case comprises a first color, and the dark coloring comprises a second color that is darker than the first color.

17. The method of claim 14 wherein the back of the electronic device case comprises a first finish having a first reflectivity, the dark coloring comprises a second finish having a second reflectivity, and the second reflectivity is less than the first reflectivity.

18. The method of claim 14 wherein the dark coloring is black.

19. A case for an electronic device comprising:
    a first base surface upon which a back of a housing of the electronic device will be placed against; and
    a camera-flash opening, comprising a hole through a back of the case comprising a back case color, wherein the camera-flash opening has a length dimension greater than a width dimension, a first material comprising a flash opening color is inserted into the camera-flash opening, and
    the flash opening color is darker than the back case color, and
    the camera-flash opening has a closed shape through which a camera flash and camera lens of the electronic device will be visible.

20. A case for an electronic device comprising:
    a first base surface upon which a back of a housing of the electronic device will be placed against; and
    a camera-flash opening, comprising a hole through a back of the case comprising a back case color, wherein the camera-flash opening has a length dimension greater than a width dimension, a first material comprising a flash opening color is snapped into the camera-flash opening, and the flash opening color is darker than the back case color, and
    the camera-flash opening has a closed shape through which a camera flash and camera lens of the electronic device will be visible.

21. A case for an electronic device comprising:
- a first base surface upon which a back of a housing of the electronic device will be placed against; and
- a camera-flash opening, comprising a hole through a back of the case comprising a back case color, wherein the camera-flash opening has a length dimension greater than a width dimension, a first material comprising a flash opening color is glued to the camera-flash opening, the flash opening color is darker than the back case color, and
- the camera-flash opening has a closed shape through which a camera flash and camera lens of the electronic device will be visible.

22. A method of making a case for an electronic device comprising:
- forming a back of the electronic device case having an inside surface and outside surface, wherein the electronic device case is adapted to hold an electronic device comprising a camera flash on its back surface, and a touch screen;
- forming a camera-flash opening in the back of the case, wherein the camera-flash opening extends from the inside surface to the outside surface, and the camera-flash opening of the case is positioned so a flash emitted by the camera flash of the electronic device passes through the camera-flash opening; and
- forming a dark coloring on an edging of the camera-flash opening of the case by inserting a first material into the camera-flash opening.

23. A method of making a case for a electronic device comprising:
- forming a back of the electronic device case having an inside surface and outside surface, wherein the electronic device case is adapted to hold an electronic device comprising a camera flash on its back surface, and a touch screen;
- forming a camera-flash opening in the back of the case, wherein the camera-flash opening extends from the inside surface to the outside surface, and the camera-flash opening of the case is positioned so a flash emitted by the camera flash of the electronic device passes through the camera-flash opening; and
- forming a dark coloring on an edging of the camera-flash opening of the case by snapping a first material into the camera-flash opening.

24. A method of making a case for a electronic device comprising:
- forming a back of the electronic device case having an inside surface and outside surface, wherein the electronic device case is adapted to hold an electronic device comprising a camera flash on its back surface, and a touch screen;
- forming a camera-flash opening in the back of the case, wherein the camera-flash opening extends from the inside surface to the outside surface, and the camera-flash opening of the case is positioned so a flash emitted by the camera flash of the electronic device passes through the camera-flash opening; and
- forming a dark coloring on an edging of the camera-flash opening of the case by gluing a first material to the camera-flash opening.

25. The case of claim 1 wherein the edging of the camera-flash opening is perpendicular to a surface of the back of the case.

26. The case of claim 1 wherein the first color comprises a black paint.

27. The case of claim 1 wherein the first color comprises a black ink.

28. The case of claim 1 wherein the edging of the camera-flash opening is rounded.

29. The case of claim 1 wherein the camera-flash opening comprises a first portion and a second portion, the first portion being closer to the back of the case than to an interior side of the case, the second portion being closer to the interior side than to the back of the case, and a width of the first portion of the camera-flash opening is greater than for the second portion.

30. The case of claim 1 wherein the camera-flash opening comprises a first portion and a second portion, the first portion being closer to the back of the case than to an interior side of the case, the second portion being closer to the interior side than to the back of the case, and a width of the first portion of the camera-flash opening is less than for the second portion.

31. The case of claim 1 wherein the camera-flash opening comprises a ring with the edging of the first color.

32. The case of claim 31 wherein the ring comprises an outer perimeter having a first portion and a second portion, the first portion being closer to the back of the case than to an interior side of the case, the second portion being closer to the interior side than to the back of the case, and a width of the first portion of the outer perimeter is less than for the second portion.

33. The case of claim 31 wherein the ring comprises an outer perimeter having a first portion and a second portion, the first portion being closer to the back of the case than to an interior side of the case, the second portion being closer to the interior side than to the back of the case, and a width of the first portion of the outer perimeter is greater than for the second portion.

34. The case of claim 11 comprising:
- a first case portion comprising the camera-flash opening; and
- a second case portion, wherein when the second case portion is seated against the first case portion, a first open-shaped opening for the first case portion merges with a second open-shaped opening for the second case portion to form a front opening of the case through which a screen of the electronic device will be visible, the front opening having a closed shape.

35. The case of claim 11 back of the case comprises a plurality of different colors, and the flash opening color is darker than the plurality of different colors.

36. The case of claim 11 wherein the flash opening color comprises a black pigment.

37. The case of claim 11 wherein the edging of the camera-flash opening is a first edging, the first material overmolded on the first edging comprises a second edging, a cross section of the first material comprises a uniform thickness from the second edging to the first edging.

38. The case of claim 11 wherein the edging of the camera-flash opening is a first edging, the first material overmolded on the first edging comprises a second edging, a cross section of the first material comprises a first portion having a first thickness and a second portion having a second thickness, and the first thickness is greater than the second thickness.

39. The case of claim 38 wherein the first portion is closer to an interior side of the case than to the back of the case.

40. The case of claim 11 wherein the edging of the camera-flash opening is a first edging, the first material overmolded on the first edging comprises a second edging, and the second edging is perpendicular to a surface of the back of the case.

41. The case of claim 11 wherein the edging of the camera-flash opening is a first edging, the first material overmolded on the first edging comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the back of the case than to an interior side of the case.

42. The case of claim 11 wherein the edging of the camera-flash opening is a first edging, the first material overmolded on the first edging comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to an interior side of the case than to the back of the case.

43. The method of claim 14 wherein the electronic device comprises a microphone on its side surface, wherein this side surface is coupled between the inside and outside surfaces.

44. The case of claim 14 wherein the edging of the camera-flash opening is a first edging, the first material overmolded on the first edging comprises a second edging, a cross section of the first material comprises a uniform thickness from the second edging to the first edging.

45. The case of claim 14 wherein the edging of the camera-flash opening is a first edging, the first material overmolded on the first edging comprises a second edging, a cross section of the first material comprises a first portion having a first thickness and a second portion having a second thickness, and the first thickness is greater than the second thickness.

46. The case of claim 45 wherein the first portion is closer to the inside surface than to the outside surface of the case.

47. The case of claim 14 wherein the edging of the camera-flash opening is a first edging, the first material overmolded on the first edging comprises a second edging, and the second edging is perpendicular to a surface of the back of the case.

48. The case of claim 14 wherein the edging of the camera-flash opening is a first edging, the first material overmolded on the first edging comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the outside surface than to the inside surface of the case.

49. The case of claim 14 wherein the edging of the camera-flash opening is a first edging, the first material overmolded on the first edging comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the inside surface than to the outside surface of the case.

50. The case of claim 19 comprising:

a battery, enclosed between the first base surface and the back of the case.

51. The case of claim 19 wherein a slope of the edging of the camera-flash opening is greater than 0.

52. The case of claim 19 comprising:

a first case portion comprising the camera-flash opening; and a second case portion, wherein when the second case portion is seated against the first case portion, a first open-shaped opening for the first case portion merges with a second open-shaped opening for the second case portion to form a front opening of the case through which a screen of the electronic device will be visible, the front opening having a closed shape.

53. The case of claim 19 back of the case comprises a plurality of different colors, and the flash opening color is darker than the plurality of different colors.

54. The case of claim 19 wherein the flash opening color comprises a black pigment.

55. The case of claim 19 wherein the edging of the camera-flash opening is a first edging, the first material inserted into the camera-flash opening comprises a second edging, a cross section of the first material comprises a uniform thickness from the second edging to the first edging.

56. The case of claim 19 wherein the edging of the camera-flash opening is a first edging, the first material inserted into the camera-flash opening comprises a second edging, a cross section of the first material comprises a first portion having a first thickness and a second portion having a second thickness, and the first thickness is greater than the second thickness.

57. The case of claim 56 wherein the first portion is closer to an interior side of the case than to the back of the case.

58. The case of claim 19 wherein the edging of the camera-flash opening is a first edging, the first material inserted into the camera-flash opening comprises a second edging, and the second edging is perpendicular to a surface of the back of the case.

59. The case of claim 19 wherein the edging of the camera-flash opening is a first edging, the first material inserted into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the back of the case than to an interior side of the case.

60. The case of claim 19 wherein the edging of the camera-flash opening is a first edging, the first material inserted into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to an interior side of the case than to the back of the case.

61. The case of claim 20 comprising:

a battery, enclosed between the first base surface and the back of the case.

62. The case of claim 20 wherein a slope of the edging of the camera-flash opening is greater than 0.

63. The case of claim 20 comprising:

a first case portion comprising the camera-flash opening; and a second case portion, wherein when the second case portion is seated against the first case portion, a first open-shaped opening for the first case portion merges with a second open-shaped opening for the second case portion to form a front opening of the case through which a screen of the electronic device will be visible, the front opening having a closed shape.

64. The case of claim 20 back of the case comprises a plurality of different colors, and the flash opening color is darker than the plurality of different colors.

65. The case of claim 20 wherein the flash opening color comprises a black pigment.

66. The case of claim 20 wherein the edging of the camera-flash opening is a first edging, the first material snapped into the camera-flash opening comprises a second edging, a cross section of the first material comprises a uniform thickness from the second edging to the first edging.

67. The case of claim 20 wherein the edging of the camera-flash opening is a first edging, the first material snapped into the camera-flash opening comprises a second edging, a cross section of the first material comprises a first portion having a first thickness and a second portion having a second thickness, and the first thickness is greater than the second thickness.

68. The case of claim 67 wherein the first portion is closer to an interior side of the case than to the back of the case.

69. The case of claim 20 wherein the edging of the camera-flash opening is a first edging, the first material snapped into the camera-flash opening comprises a second edging, and the second edging is perpendicular to a surface of the back of the case.

70. The case of claim 20 wherein the edging of the camera-flash opening is a first edging, the first material snapped into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the back of the case than to an interior side of the case.

71. The case of claim 20 wherein the edging of the camera-flash opening is a first edging, the first material snapped into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to an interior side of the case than to the back of the case.

72. The case of claim 21 comprising:

a battery, enclosed between the first base surface and the back of the case.

73. The case of claim 21 wherein a slope of the edging of the camera-flash opening is greater than 0.

74. The case of claim 21 comprising:

a first case portion comprising the camera-flash opening; and a second case portion, wherein when the second case portion is seated against the first case portion, a first open-shaped opening for the first case portion merges with a second open-shaped opening for the second case portion to form a front opening of the case through which a screen of the electronic device will be visible, the front opening having a closed shape.

75. The case of claim 21 back of the case comprises a plurality of different colors, and the flash opening color is darker than the plurality of different colors.

76. The case of claim 21 wherein the flash opening color comprises a black pigment.

77. The case of claim 21 wherein the edging of the camera-flash opening is a first edging, the first material glued on the first edging comprises a second edging, a cross section of the first material comprises a uniform thickness from the second edging to the first edging.

78. The case of claim 21 wherein the edging of the camera-flash opening is a first edging, the first material glued to the camera-flash opening comprises a second edging, a cross section of the first material comprises a first portion having a first thickness and a second portion having a second thickness, and the first thickness is greater than the second thickness.

79. The case of claim 78 wherein the first portion is closer to an interior side of the case than to the back of the case.

80. The case of claim 21 wherein the edging of the camera-flash opening is a first edging, the first material glued to the camera-flash opening comprises a second edging, and the second edging is perpendicular to a surface of the back of the case.

81. The case of claim 21 wherein the edging of the camera-flash opening is a first edging, the first material glued to the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the back of the case than to an interior side of the case.

82. The case of claim 21 wherein the edging of the camera-flash opening is a first edging, the first material glued to the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to an interior side of the case than to the back of the case.

83. The method of claim 22 wherein the dark coloring of the first material comprises a black pigment.

84. The method of claim 22 wherein the back of the electronic device case comprises a first color, and the dark coloring comprises a second color that is darker than the first color.

85. The method of claim 22 wherein the back of the electronic device case comprises a first finish having a first reflectivity, the dark coloring comprises a second finish having a second reflectivity, and the second reflectivity is less than the first reflectivity.

86. The method of claim 22 wherein the dark coloring is black.

87. The case of claim 22 wherein the edging of the camera-flash opening is a first edging, the first material inserted into the first edging comprises a second edging, a cross section of the first material comprises a uniform thickness from the second edging to the first edging.

88. The case of claim 22 wherein the edging of the camera-flash opening is a first edging, the first material inserted into the camera-flash opening comprises a second edging, a cross section of the first material comprises a first portion having a first thickness and a second portion having a second thickness, and the first thickness is greater than the second thickness.

89. The case of claim 88 wherein the first portion is closer to the inside surface than to the outside surface of the case.

90. The case of claim 22 wherein the edging of the camera-flash opening is a first edging, the first material inserted into the camera-flash opening comprises a second edging, and the second edging is perpendicular to a surface of the back of the case.

91. The case of claim 22 wherein the edging of the camera-flash opening is a first edging, the first material inserted into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the outside surface than to an inside surface of the case.

92. The case of claim 22 wherein the edging of the camera-flash opening is a first edging, the first material inserted into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the inside surface than to the outside surface of the case.

93. The method of claim 23 wherein the dark coloring of the first material comprises a black pigment.

94. The method of claim 23 wherein the back of the electronic device case comprises a first color, and the dark coloring comprises a second color that is darker than the first color.

95. The method of claim 23 wherein the back of the electronic device case comprises a first finish having a first reflectivity, the dark coloring comprises a second finish having a second reflectivity, and the second reflectivity is less than the first reflectivity.

96. The method of claim 23 wherein the dark coloring is black.

97. The case of claim 23 wherein the edging of the camera-flash opening is a first edging, the first material snapped into the camera-flash opening comprises a second edging, a cross section of the first material comprises a uniform thickness from the second edging to the first edging.

98. The case of claim 23 wherein the edging of the camera-flash opening is a first edging, the first material snapped into the camera-flash opening comprises a second edging, a cross section of the first material comprises a first portion having a first thickness and a second portion having a second thickness, and the first thickness is greater than the second thickness.

99. The case of claim 98 wherein the first portion is closer to the inside surface than to the outside surface of the case.

100. The case of claim 23 wherein the edging of the camera-flash opening is a first edging, the first material snapped into the camera-flash opening comprises a second edging, and the second edging is perpendicular to a surface of the back of the case.

101. The case of claim 23 wherein the edging of the camera-flash opening is a first edging, the first material snapped into the camera-flash opening comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the outside surface than to the inside surface of the case.

102. The case of claim 23 wherein the edging of the camera-flash opening is a first edging, the first material snapped on the first edging comprises a second edging, a first portion of the camera-flash opening comprises a first opening distance from the second edging of the first material on one side of the camera-flash opening to an opposite side of the camera-flash opening, a second portion of the camera-flash opening comprises a second opening distance from the second edging of the first material on one side of the camera-flash opening to an opposite side of the camera-flash opening, the first distance is greater than the second distance, and the first portion is closer to the inside surface than to the outside surface of the case.

103. The method of claim 24 wherein the dark coloring of the first material comprises a black pigment.

104. The method of claim 24 wherein the back of the electronic device case comprises a first color, and the dark coloring comprises a second color that is darker than the first color.

105. The method of claim 24 wherein the back of the electronic device case comprises a first finish having a first reflectivity, the dark coloring comprises a second finish having a second reflectivity, and the second reflectivity is less than the first reflectivity.

106. The method of claim 24 wherein the dark coloring is black.

107. The case of claim 24 wherein the edging of the camera-flash opening is a first edging, the first material glued to the camera-flash opening comprises a second edging, a cross section of the first material comprises a uniform thickness from the second edging to the first edging.

108. The case of claim 24 wherein the edging of the camera-flash opening is a first edging, the first material glued to the camera-flash opening comprises a second edging, a cross section of the first material comprises a first portion having a first thickness and a second portion having a second thickness, and the first thickness is greater than the second thickness.

109. The case of claim 108 wherein the first portion is closer to the inside surface than to the outside surface of the case.

110. The case of claim 24 wherein the edging of the camera-flash opening is a first edging, the first material glued to the camera-flash opening comprises a second edging, and the second edging is perpendicular to a surface of the back of the case.

111. The case of claim 24 wherein the edging of the camera-flash opening is a first edging, the first material glued to the camera-flash opening comprises a second edging,
 a first portion of the camera-flash opening comprises a first opening distance from the second edging of the first material on one side of the camera-flash opening to an opposite side of the camera-flash opening,
 a second portion of the camera-flash opening comprises a second opening distance from the second edging of the first material on one side of the camera-flash opening to an opposite side of the camera-flash opening,
 the first distance is greater than the second distance, and
 the first portion is closer to the outside surface than to the inside surface of the case.

112. The case of claim 24 wherein the edging of the camera-flash opening is a first edging, the first material glued to the camera-flash opening comprises a second edging,
 a first portion of the camera-flash opening comprises a first opening distance from the second edging of the first material on one side of the camera-flash opening to an opposite side of the camera-flash opening,
 a second portion of the camera-flash opening comprises a second opening distance from the second edging of the first material on one side of the camera-flash opening to an opposite side of the camera-flash opening,
 the first distance is greater than the second distance, and
 the first portion is closer to the inside surface than to the outside surface of the case.

\* \* \* \* \*